(12) United States Patent
Ogawa

(10) Patent No.: US 8,312,538 B2
(45) Date of Patent: Nov. 13, 2012

(54) SITE CHECK METHOD

(75) Inventor: Hideharu Ogawa, Shinagawa-ku (JP)

(73) Assignee: Passlogy Co., Ltd., Tokyo (JP)

( * ) Notice: Subject to any disclaimer, the term of this patent is extended or adjusted under 35 U.S.C. 154(b) by 1018 days.

(21) Appl. No.: 12/065,504

(22) PCT Filed: Jul. 27, 2006

(86) PCT No.: PCT/JP2006/314874
§ 371 (c)(1),
(2), (4) Date: Feb. 29, 2008

(87) PCT Pub. No.: WO2007/026486
PCT Pub. Date: Mar. 8, 2007

(65) Prior Publication Data
US 2009/0271868 A1    Oct. 29, 2009

(30) Foreign Application Priority Data
Aug. 30, 2005    (JP) ................... 2005-249857

(51) Int. Cl.
*G06F 11/00* (2006.01)
*G06F 7/04* (2006.01)
(52) U.S. Cl. ........................... 726/22; 726/3
(58) Field of Classification Search .......... 726/2–4, 726/8, 22–26; 713/150, 164–170, 176, 187–188; 709/217, 219, 223–225, 248
See application file for complete search history.

(56) References Cited

U.S. PATENT DOCUMENTS

| | | | |
|---|---|---|---|
| 6,018,724 A | 1/2000 | Arent | |
| 6,393,126 B1* | 5/2002 | van der Kaay et al. | 380/241 |
| 7,340,610 B1* | 3/2008 | Yagawa | 713/178 |
| 7,698,442 B1* | 4/2010 | Krishnamurthy et al. | 709/229 |
| 7,861,077 B1* | 12/2010 | Gallagher, III | 713/155 |
| 2002/0177433 A1* | 11/2002 | Bravo et al. | 455/411 |
| 2003/0046541 A1* | 3/2003 | Gerdes et al. | 713/168 |
| 2003/0159031 A1* | 8/2003 | Muller et al. | 713/155 |
| 2003/0159048 A1* | 8/2003 | Matsumoto et al. | 713/178 |
| 2003/0204725 A1* | 10/2003 | Itoi et al. | 713/168 |
| 2005/0172229 A1* | 8/2005 | Reno et al. | 715/700 |
| 2006/0149846 A1* | 7/2006 | Schuba | 709/229 |

(Continued)

FOREIGN PATENT DOCUMENTS

JP    2001-282736    10/2001

(Continued)

OTHER PUBLICATIONS

Patent Abstracts of Japan, Publication No. 2001-282736 dated Oct. 12, 2001, 2 pages.

(Continued)

*Primary Examiner* — Darren B Schwartz
(74) *Attorney, Agent, or Firm* — Osha Liang LLP

(57) ABSTRACT

A site check method is provided that enables a user to check, when the user accesses a predetermined site, whether the site is legitimate or not. The method includes a first display step in which, when the user accesses a first server managing the site from a first information terminal, the first server has the first information terminal display predetermined check information. The method further includes a second display step in which, when the user accesses a second server from a second information terminal, the second server has the second information terminal display the check information.

20 Claims, 34 Drawing Sheets

U.S. PATENT DOCUMENTS

2008/0098466 A1* 4/2008 Yoshida et al. .................... 726/5
2009/0119754 A1* 5/2009 Schubert ........................... 726/4
2009/0300738 A1* 12/2009 Dewe et al. ....................... 726/6

FOREIGN PATENT DOCUMENTS

| JP | 2003-528383 | 9/2003 |
|---|---|---|
| JP | 2005-092683 | 4/2005 |
| WO | 02/091144 A1 | 11/2002 |
| WO | 03/084127 A1 | 10/2003 |

OTHER PUBLICATIONS

Patent Abstracts of Japan, Publication No. 2005-092683, dated Apr. 7, 2005, 1 page.

K. Shibata, et al., "A Method of URL Validation to Prevent Phishing Attacks," DICOMO 2005 Symposium Ronbunshu (Information Processing Society of Japan Symposium Series vol. 2005, No. 6), Jul. 6, 2005, p. 485-488, with Concise Explanation of Relevance, 5 pages.
International Search Report issued in PCT/JP2006/314874, mailed on Oct. 10, 2006, with translation, 5 pages.
Written Opinion issued in PCT/JP2006/314874, mailed on Oct. 10, 2006 (no translation), 4 pages.
Extended European Search Report for European Application No. 06781785.8 dated Apr. 23, 2012 (6 pages).
Dr. Jonathan Tuliani; "The Future of Phishing"; XP002384134, retrieved from URL:http//www.cryptomathic.com/pdf/the%20Future%20ofPhishing.pdf, retreived Jun. 7, 2006 (3 pages).

* cited by examiner

FIG. 5 abcd1234

40

THE PASSWORD IS:
wxyz

SITE CHECK METHOD

BACKGROUND OF THE INVENTION

1. Field of the Invention

The present invention relates to a site check method that enables a user to check whether a site the user accesses is legitimate (i.e., secure) or not.

2. Description of the Related Art

JP2005-092683 A (Patent document 1) discloses a conventional user authentication system. This conventional user authentication system stores a sequence of authentication by plural authentication means and uses also a sequence of selection for the plural authentication means as authentication information in order to enhance a security function.

Patent document 1: JP 2005-092683A

However, the above-described conventional user authentication system has a problem in which, if a user accidentally accesses an illegitimate system that spoofs the user authentication system, even the above sequence of selection for the plural authentication means is acquired by the illegitimate system. In the above conventional user authentication system, the user has to check, for example, whether the URL, which consists of complicated letter and number strings, is correct or not in order to check whether the system the user has accessed is legitimate or not.

SUMMARY OF THE INVENTION

Provided according to a first aspect of one or more embodiments of this invention is a site check method that enables a user to check, when the user accesses a predetermined site, whether the site is legitimate or not, the method including: a first display step in which, when the user accesses a first server managing the site from a first information terminal, the first server has the first information terminal display predetermined check information; and a second display step in which, when the user accesses a second server from a second information terminal, the second server has the second information terminal display the check information.

The above site check method according to claim 1 may farther include: a step in which the first server synchronizes its time with time in the second server; and a step in which the first server and the second server store in advance site identification information for identifying the first server, in which the first display step includes a first creation step in which the first server creates the check information based on the time the first information terminal accessed the first server and the site identification information, and the second display step includes a second creation step in which the second server creates check information based on the time the second information terminal accessed the second server and the site identification information.

In the above site check method, in the first display step, when the first information terminal accesses the first server, the first server may have the first information terminal access the second server, and the second server may creates the check information based on the time the first information terminal accessed the second server and transmit the created check information to the first information terminal; and in the second display step, the second server may create the check information based on the time the second information terminal accessed the second server and transmit the created check information to the second information terminal.

The above site check method may further include a step in which the second server stores in advance a URL for the first server, in which: the first display step further includes a step in which, when the first information terminal accesses the first server, the first server has the first information terminal transmit the URL of the first server to the second server; and the second display step further includes a step in which the second server transmits, if the URL transmitted from the first information terminal does not match the URL that has been stored in advance in the second server, information different from the check information to the first information terminal.

In the above site check method, in the first display step, when the first information terminal accesses the first server, the first server may have the first information terminal access a third server, and when the first information terminal accesses the third server, the third server may transmits the check information to the first information terminal.

In the above site check method, in the first display step and the second display step, the first server and the third server may have the first information terminal and the second information terminal display a predetermined check image as the check information.

The above site check method may further include a step in which the third server stores a program for creating the check image, in which the first display step includes a step in which, when the first information terminal accesses the first server, the first server has the first information terminal start the program to operate the third server to create the check image.

In the above site check method, in the first display step, when the first information terminal accesses the first server, the first server may have the first server transmit the server identification information for identifying the first server to the third server, and the third server may create the check image based on the server identification information; and in the second display step, the second server may create the check image based on the server identification information.

The above site check method may further include a step in which the second server synchronizes its time with the time of the third server, in which: in the first display step, the third server creates the check image based also on the time the first information terminal accessed the third server; and in the second display step, the second server creates the check image based also on the time the second information terminal accessed the second server.

The above site check method may further include a step in which the second server stores in advance a domain used by the user, in which the first display step further includes: a step in which when the first information terminal accesses the first server, the first server acquires the domain of the first information terminal; a step in which the first server reports the acquired first information terminal domain to the second server; and a step in which the second server judges whether or not the acquired domain is included in the domain stored in advance in the second server and reports the judgment result to the first server.

The above site check method may further include: a step in which the second server associates first terminal identification information for identifying the first information terminal with second terminal identification information for identifying the second information terminal and stores the associated terminal identification information; a step in which, when the first information terminal accesses the first server, the first server transmits the first terminal identification information to the second server; and a step in which the second server reports to the first server whether or not the second information terminal associated with the first terminal identification information has accessed the second server.

Provided according to a second aspect of one or more embodiments of this invention is a site check method that enables a user to check whether a site the user has accessed is legitimate or not, the method including: a first display step in which, when the user accesses a first server managing the site from a first information terminal, the first server has the first information terminal display a first screen including predetermined check information; and a second display step in which, when the user accesses a second server from the first information terminal, the second server has the first information terminal display a second screen including the check information.

In the above site check method, the first display step may further include a step in which when the first information terminal accesses the first server, the first server acquires an IP address of the first information terminal and reports the IP address to the second server; and the second display step may further include: a step in which, when the first information terminal accesses the second server, the second server acquires the IP address of the first information terminal; and a step in which the second server compares the IP address reported by the first server with the IP address acquired by the second server.

The above site check method may further include: a step in which the second server stores in advance an access key in the first information terminal; and a step in which the second server stores in advance the access key, in which the second display step further includes: a step in which when the first information terminal accesses the second server, the second server judges whether or not the access key stored in the first information terminal matches with the access key stored in the second server; a step in which, when determining that those access keys match each other, the second server has the first information terminal display the second screen; and a step in which, when determining those access keys match each other, the second server updates the access key stored in the first information terminal.

BRIEF DESCRIPTION OF THE DRAWINGS

FIG. 5 is a diagram showing another example of a screen 40 displayed on the mobile phone 16.

DETAILED DESCRIPTION

[First Embodiment]

Figure 1:
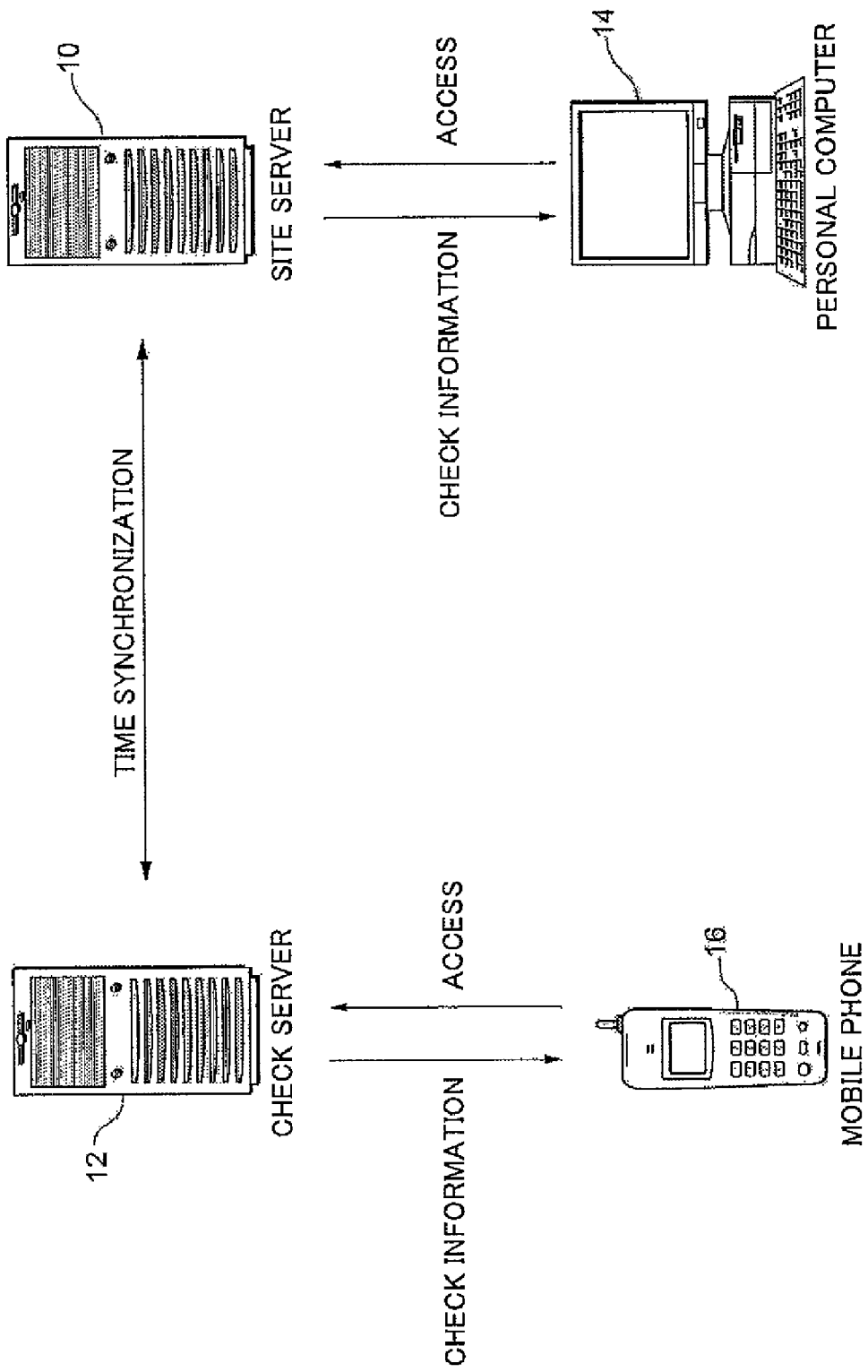
FIG. 1 is a schematic diagram showing a system that performs a site check method according to a first embodiment.

FIG. 1 is a schematic diagram showing a system that executes a site check method according to this embodiment. The system in this embodiment includes a site server 10 that is an example of a first server, a check server 12 that is an example of a second server, a personal computer 14 that is an example of a first information terminal and a mobile phone 16 that is an example of a second information terminal.

The site check method in this embodiment enables a user, when the user accesses a site managed by the site server 10 from the personal computer 14, to access the check server 12 through the mobile phone 16 and check whether the site the user has accessed is a legitimate (i.e., secure) site or an illegitimate site, such as a phishing site.

The site server 10 is a server that manages a site used by users. The site server 10 is connected to the personal computer 14 via a communication line such as the Internet. The site managed by the site server 10 is a site, such as an online banking site or online shopping site, requesting a user to input information such as a password and a credit card number.

When accessed by the user via the personal computer 14, the site server 10 transmits an HTML document and has the personal computer 14 display a screen including predetermined check information so that the user can check whether the relevant site is legitimate or not. The site server 10 stores in advance time information including a time synchronous with that of the check server 12 and a site ID unique to the site server 10 to create the check information, and creates the check information based on these pieces of information. The site ID is an example of server identification information for identifying the site server 10. The operation of the site server 10 for creating and transmitting the check information will be described later.

The check server 12 creates check information and has the mobile phone 16 display this check information so that the user can check whether the site that the user has accessed is legitimate or not. The check server 12 stores in advance time information including a time synchronous with that of the site server 10 and the site ID of the site server 10, and creates the check information based on this information.

The operation of the check server 12 for creating and transmitting the check information will be described later.

The personal computer 14 is a terminal that the user uses for accessing the site server 10. The personal computer 14 is configured to be connectable to the Internet and installed with a web client function. Although the personal computer 14 is employed as the terminal for accessing the site server 10 in this embodiment, the terminal may not be limited to the personal computer, and any terminal may be employed as long as it can access the site server 10 via a communication line, e.g., a PDA or a mobile phone.

The mobile phone 16 is a terminal that the user uses for accessing the check server 12 to acquire a check image. The mobile phone 16 is configured to be connectable to the Internet from a packet communication network via a gateway and can be connected to various nodes on the Internet such as the check server 12. Although the mobile phone 16 is employed as a terminal for accessing the check server 12 in this embodiment, the terminal may not be limited to the mobile phone 16, and any terminal may be employed as long as it can access the check server 12 via a communication line, e.g., a PDA or a personal computer. An example in which the personal computer 14 accesses the check server 12 will be described in another embodiment.

Figure 2:
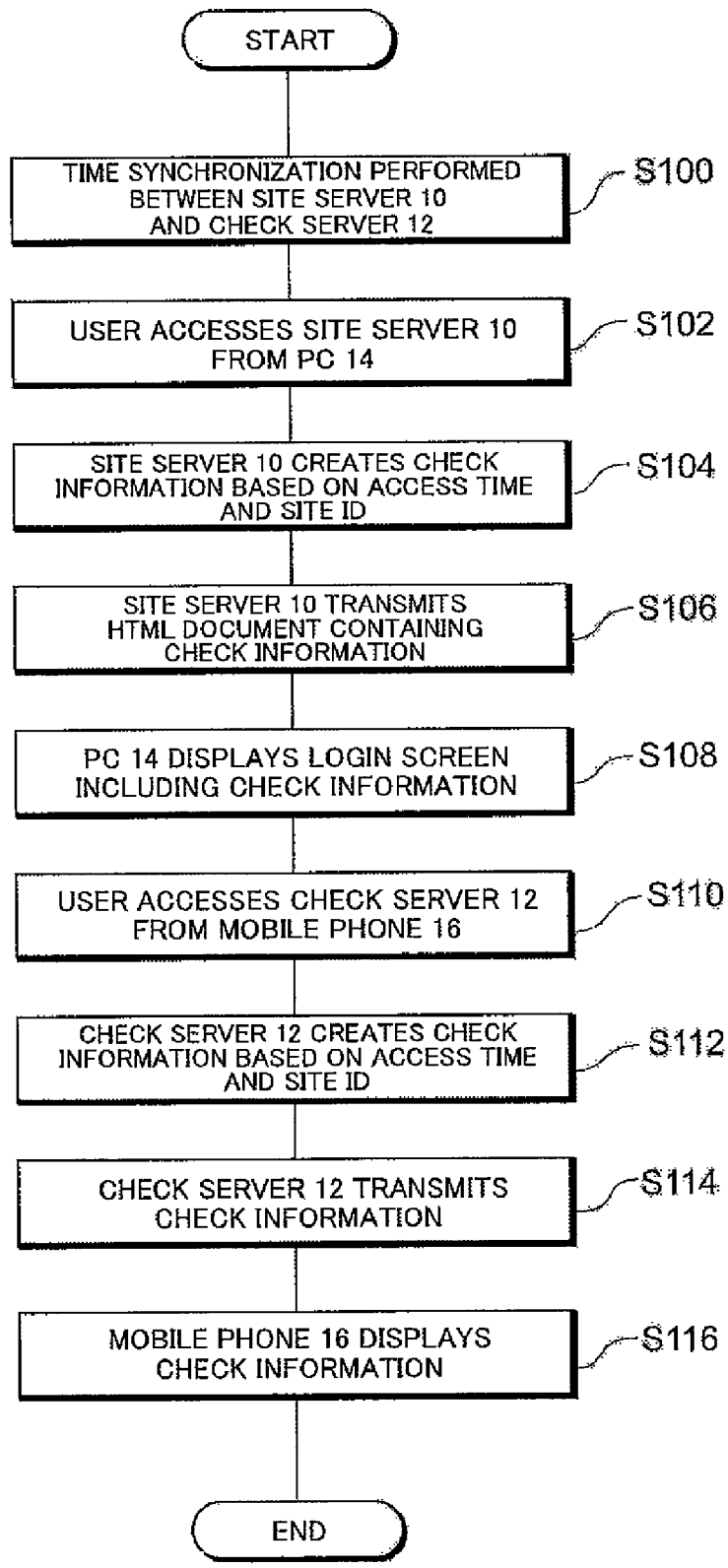
FIG. 2 is a flowchart explaining a processing sequence in the site check method according to the first embodiment.

FIG. 2 is a flowchart explaining a processing sequence of the site check method according to this embodiment. Although the processing is sequentially explained in the flowchart, the processing is not limited to this sequence. Accordingly, the sequence may be rearranged or some operations may be performed in parallel as long as that change does not cause a different operation result.

As shown in FIG. 2, the site server 10 and the check server 12 synchronize their internal timers with each other in advance (S100). Specifically, the site server 10 and the check server 12 synchronize their internal timers with a time acquired from an external time server by a network time protocol (NTP) in order to synchronize their internal timers with each other. The site server 10 and the check server 12 may perform the time synchronization at regular intervals. The method for performing the time synchronization is not limited to one using the NTP, and, for example, the time synchronization may be performed by connecting the site server 10 and the check server 12 with each other via a communication line. Also, the timers of the site server 10 and the check server 12 may be set individually to keep substantially the same time. The number of times for performing the time synchronization may either be one or more.

Next, the user accesses the site server 10 (site) from the personal computer (PC) 14 (S102). For example, the user operates a web browser and accesses the site server 10 in order to display on the personal computer 14 a login screen for logging in a site managed by the site server 10.

Then the site server 10 creates check information based on the access time the personal computer 14 accessed the site server 10 and the site ID for identifying the site server 10 (S104). If the site server 10 receives additional information for identifying the user from the personal computer 14, the site server 10 may create the check information based also on this additional information. With this arrangement, the site server 10 can create unique check information for each user.

The check information is information displayed on the personal computer 14 and the mobile phone 16 so that the user can check whether the site the user accessed from the personal computer 14 is legitimate or not. The site server 10 stores in advance a program for creating the check information. In this example in which the site ID is "abcd" and the time the user made an access is "1234," the site server 10 uses the program to create a character string "abcd1234" as check information.

The check information may be provided by any form as long as the user can identify it, e.g., letter strings, character strings, texture images, colors, and audio, or a form that can be visually recognized by the user easily such as a combination of a texture image and a color. An example in which the check information is formed by an image will be described in another embodiment. When the check information displayed on the personal computer 14 and the check information displayed on the mobile phone 16 match with each other, the user can determine that the site the user accessed from the personal computer 14 is legitimate, while when they do not match with each other, the user can determine that this site might possibly be illegitimate (i.e., the site might be a phishing site).

When creating the check information, the site server 10 transmits an HTML document including the created check information to the personal computer 14 (S106). When receiving the HTML document from the site server 10, the personal computer 14 displays a predetermined screen based on the received document (S108). When the check information is a character string, the site server 10 may transmit the character string as a part of the HTML document or the hyperlink of the check information may be incorporated in the HTML document.

Figure 3A:
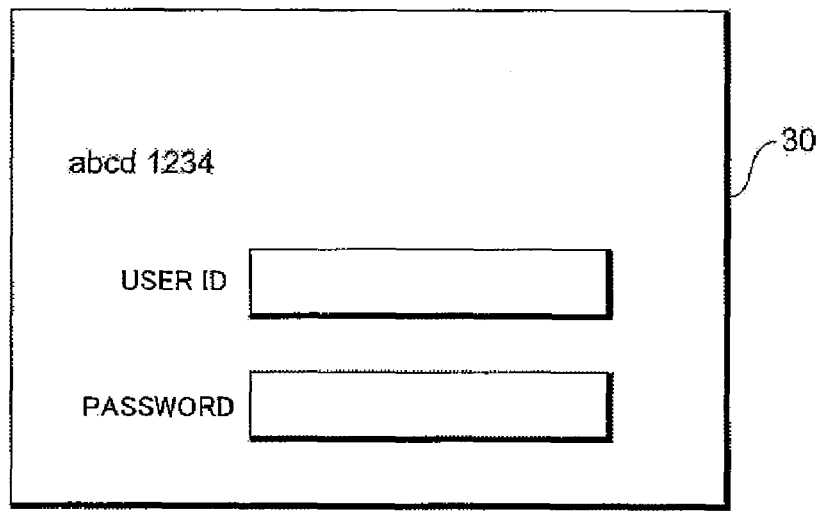
FIG. 3 is a diagram showing an example of a screen displayed on a personal computer 14.
Figure 3B:
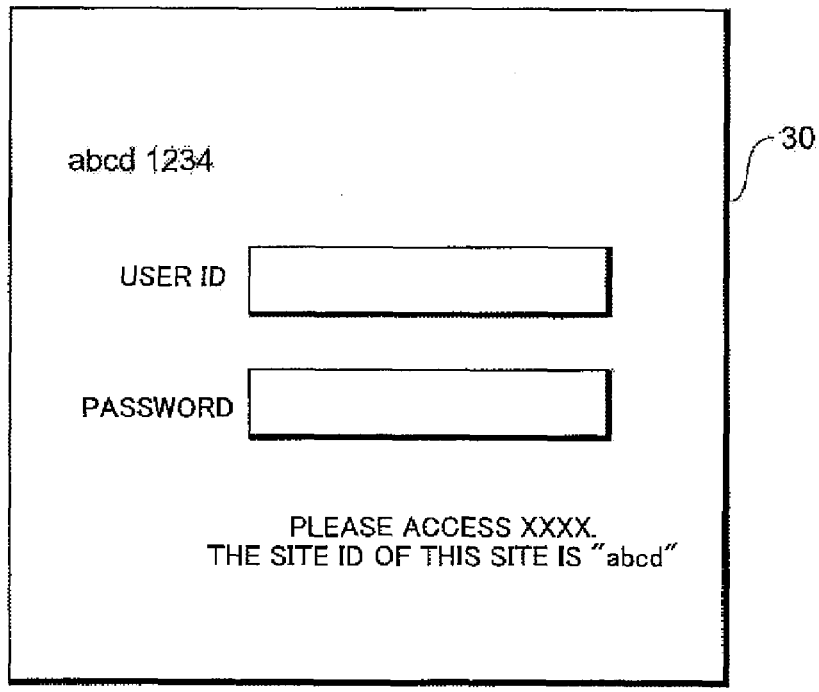

FIG. 3 shows an example of the screen displayed on the personal computer 14 in S108. In an example shown in FIG. 3A, the HTML document that the personal computer 14 has obtained is for displaying a login screen 30, and the check information "abcd1234" created by the site server 10 is displayed in a part of the login screen 30. Also, as shown in FIG. 3B, the site server 10 may display in the login screen 30 the address of the check server 12 and the site ID of the site server 10 in order to prompt the user to access the check server 12.

Referring back to FIG. 2, the user transmits the site ID of the site server 10 from the mobile phone 16 to the check server 12 (S110). For example, the user operates the mobile phone 16 and specifies the URL that has been registered as a so-called bookmark to access the check server 12 so that a site ID transmission screen is displayed on the mobile phone 16. Then the user inputs the site ID (e.g., "abcd") of the site server 10 in this transmission screen and transmits the site ID to the check server 12. The check server 12 may store in advance an individual identification number for identifying the mobile phone 16 of the user and the site ID of the site server 10 while associating them with each other so that it can recognize the site ID when the user operates the mobile phone 16 to transmit the individual identification number to the check server 12.

Next, the check server 12 creates check information based on the time the user accessed the check sever 12 from the mobile phone 16 and the site ID of the site server 10 (S112). Since the check server 12 creates the check information using the same program as that used by the site server 10, if the time the user accessed the check server 12 from the mobile phone 16 is identical to the time the user accessed the site server 10 from the personal computer 14, the check server 12 creates check information the same as the check information created by the site server 10. Here, if the check server 12 receives additional information for identifying the user from the mobile phone 16, it may create the check information based also on his additional information. With this arrangement, the check server 12 can create unique check information for each user.

The site server 10 and the check server 12 judge the access times based on a certain time range, e.g., 90 seconds and 120 seconds. Specifically, even if there is a time lag between the time the user accessed the site server 10 from the personal computer 14 and the time the user accessed the check server 12 from the mobile phone 16, the site server 10 and the check server 12 judge that those accesses were made at the same time as long as the time lag is within the above time range.

Accordingly, in this example, if the user accesses the check server 12 from the mobile phone 16 within the above time range, this access time is recognized as "1234", which is the time the user accessed the site server 10 from the personal computer 14. Since the site ID that has been transmitted from the mobile phone 16 to the check server 12 is, in this example, also "abcd," which indicates the site server 10, the check server 12 creates the check information "abcd1234."

Next, the check server 12 transmits the created check information to the mobile phone 16 (S114) and the mobile phone 16 displays a screen including the received check information (S116).

Figure 4:
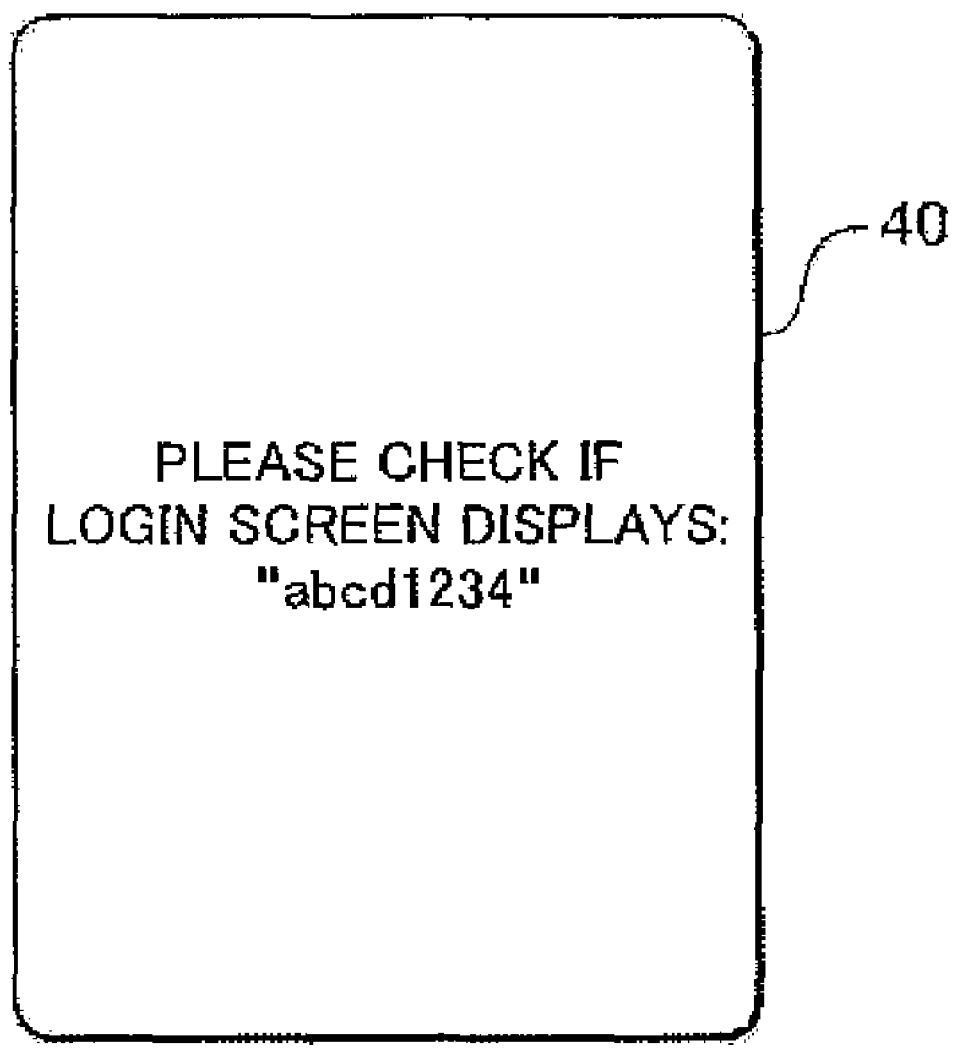
FIG. 4 is a diagram showing an example of a screen displayed on a mobile phone 16.

FIG. 4 is a diagram showing an example of a screen displayed on the mobile phone 16 in S116. In the example shown in FIG. 4, the check information "abcd1234" created by the check server 12 is displayed in a part of a screen 40 displayed on the mobile phone 16. Here, as shown in the same figure, the check server 12 may display the screen 40 in such a way that this screen prompts the user to check whether the same check information is displayed in the login screen 30 (see FIG. 3) on the personal computer 14.

Figure 5:
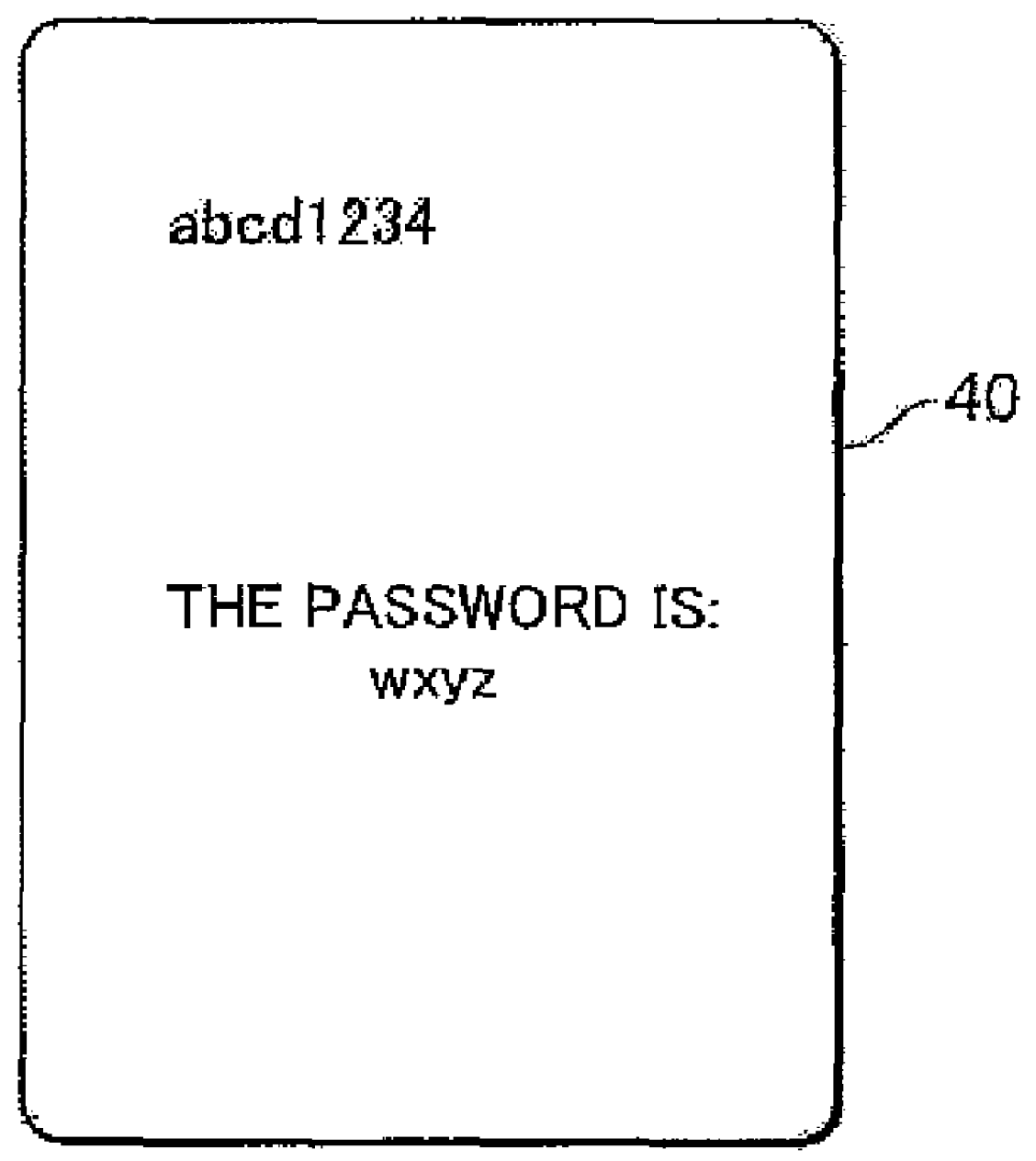

FIG. 5 is a diagram showing another example of the screen 40 displayed on the mobile phone 16 in S116. In the example shown in FIG. 5, a password for the user to login to the site server 10 from the personal computer 14 is also displayed in a part of the screen 40 displayed on the mobile phone 16.

In this example, the check server 12 also creates a password in S112 and transmits the created password to the mobile phone 16 in S114. The mobile phone 16 displays the received password "wxyz" together with the check information "abcd1234" in the screen 40 in S116. The password created by the check server 12 may be a one-time password.

Figure 6:
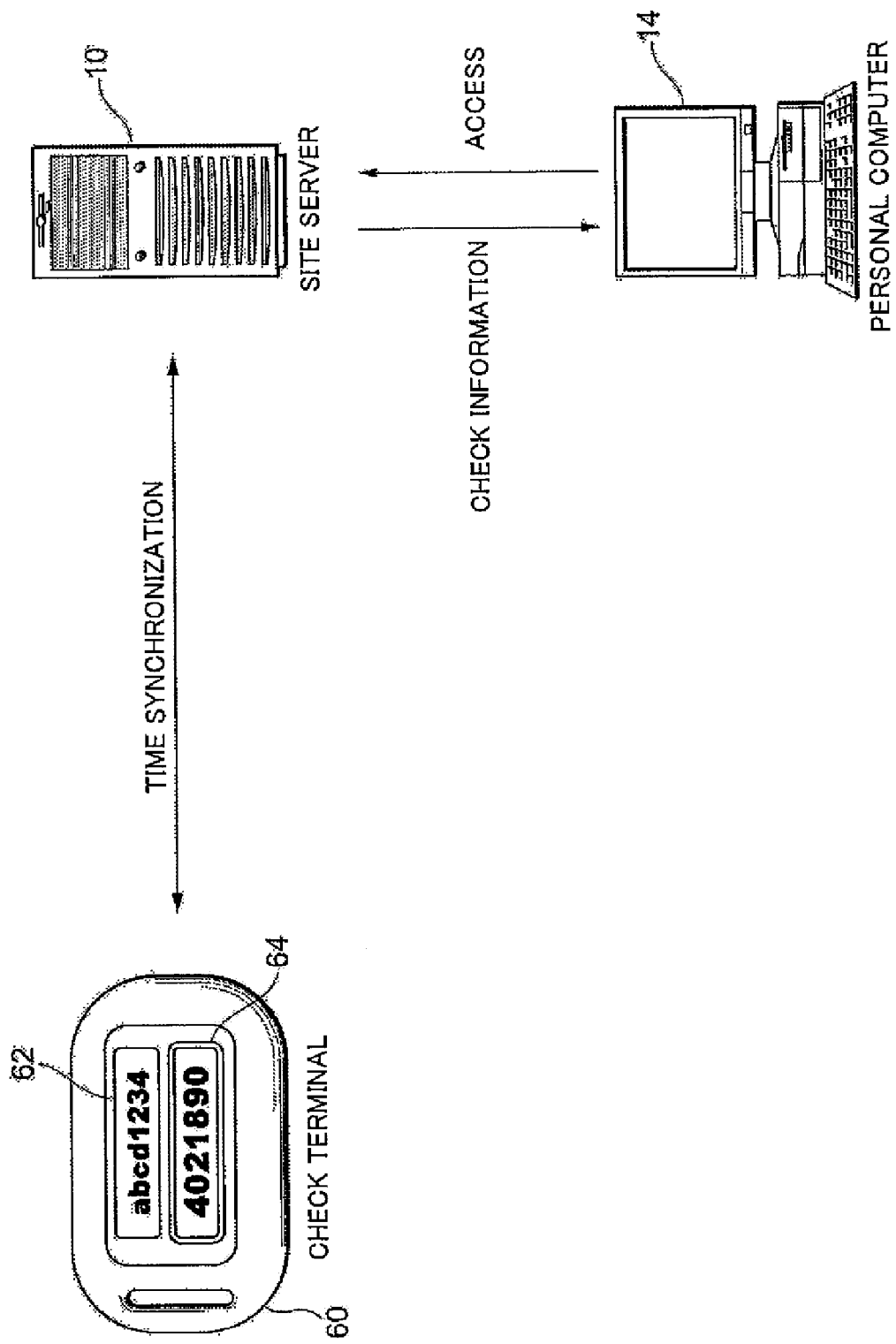
FIG. 6 is a schematic diagram showing another example of the system that performs the site check method according to the first embodiment.

FIG. 6 is a schematic diagram showing another example of the system that executes the site check method according to the first embodiment. In this example, the system includes a check terminal 60 instead of the check server 12 and the mobile phone 16. The check terminal 60 may be, for example, a hardware token that includes a display section 62 for displaying check information.

Like the check server 12, the check terminal 60 stores in advance time information including time that has been synchronized with the time of the site server 10, creates check information based on the time information at a certain interval and displays the check information in the display section 62. In other words, in the check method in this example, the check terminal 60 itself creates check information at a certain interval instead of the flow from S110 to S116 in FIG. 2 and provides the check information to the user. The check terminal 60 creates the check information based on the time information and according to the same algorithm as the site server 10, and it may store in advance the site ID indicating the site server 10 or may prompt the user to input the site ID and create the check information based also on this site ID. In addition, the check terminal 60 may be configured to display a check image or a presentation pattern which will be described later.

The check terminal 60 is not limited to the hardware token and may be an information terminal, such as a mobile phone or a PDA, which is provided with the function of the check terminal 60. If the information terminal provided with the function of the check terminal 60 is employed, this function may be realized by hardware or by software such as i-Apli (registered trademark).

In this example, the check terminal 60 also creates an authentication token (one-time password) based on the time information at a certain interval and displays the authentication token on the display section 64 to prompt the user to input the authentication token as a part of the password in the login screen 30 shown in FIG. 3.

The site server 10 creates an authentication token based on time information and according to the same algorithm as the check terminal 60 and judges whether the password transmitted from the personal computer 14 is correct or not based on the authentication token.

Although both the site server 10 and the check server 12 have the personal computer 14 and the mobile phone 16 display the letter string and the number string as the check information in this embodiment, either the site server 10 or the check server 12 may have the personal computer 14 or the mobile phone 16 display an image that enables the user to recognize the letter string and number string as the check information.

According to this embodiment, since the user accesses the site server 10 and the check server 12 respectively from the personal computer 14 and the mobile phone 16 to have the check information be displayed on the personal computer 14 and the mobile phone 16, the user can determine whether the site managed by the site server 10 is legitimate or not. In particular, in this embodiment, the user can determine whether the relevant site is legitimate or not only by visually recognizing the screens on the mobile phone 16 and the personal computer 14 without the need for checking a complicated letter string like the URL of the site.

In addition, according to this embodiment, the site that the user has accessed can be checked only by additionally having an existing authentication system perform additional processing for displaying the check information, thereby providing a site check method that is quite inexpensive and easy to be introduced.

[Second Embodiment]

This embodiment is a modification of the first embodiment, and in this embodiment, the check server 12 incorporates the created information into a presentation pattern that is used by the user for extracting a password and transmits it to the mobile phone 16 so that the mobile phone 16 displays it. The below description will describe the second embodiment, mainly the points different from the first embodiment.

Figure 7:
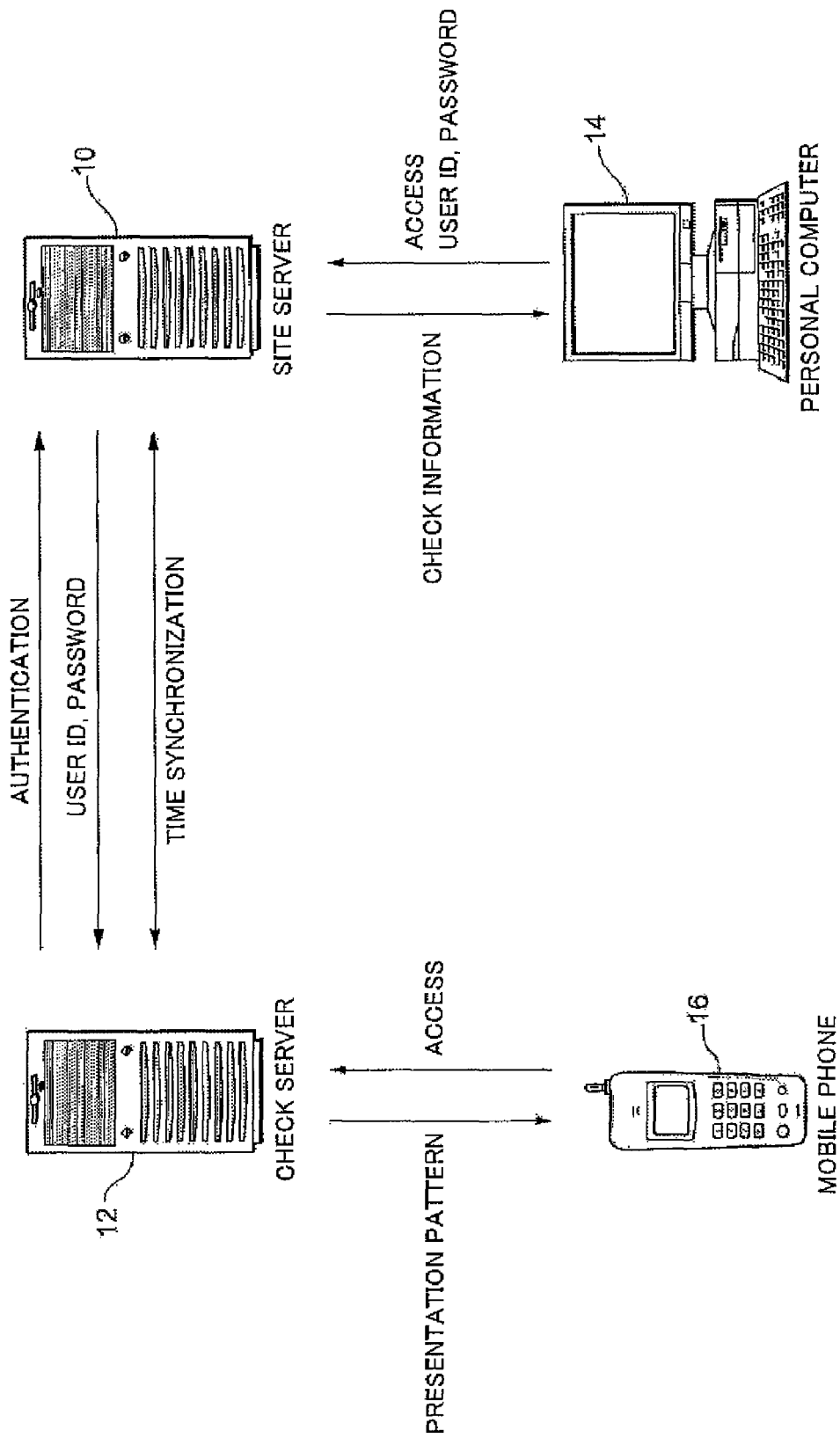
FIG. 7 is a schematic diagram showing a system that performs a site check method according to a second embodiment.

FIG. 7 is a schematic diagram showing a system that executes a site check method according to this embodiment. In the system in this embodiment, the site server 10 and the check server 12 are configured so as to enable communication between them, in addition to the configuration in the first embodiment.

Figure 8:
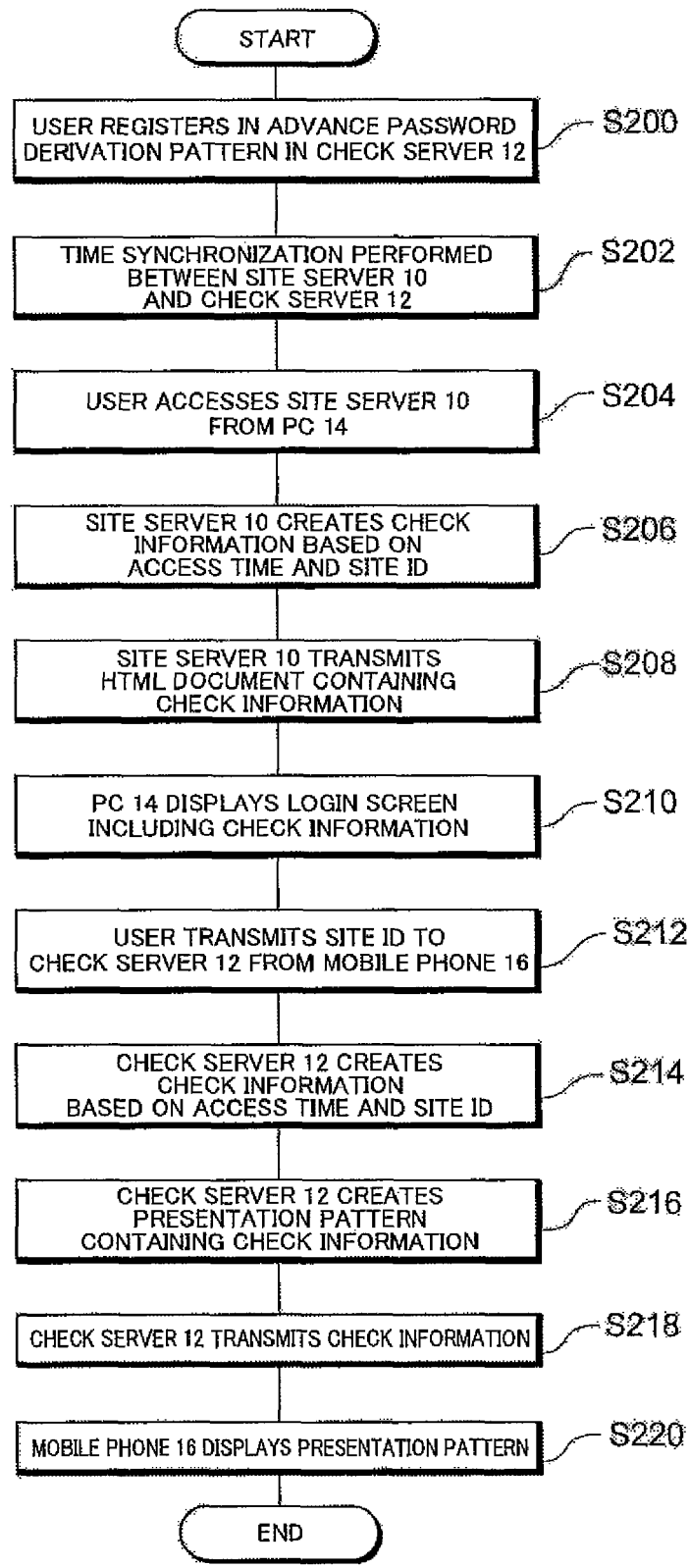
FIG. 8 is a flowchart explaining a processing sequence in the site check method according to the second embodiment.

FIG. 8 is a flowchart explaining a processing sequence in the site check method according to this embodiment. Although the processing is sequentially explained in the flowchart below, the processing is not limited to this sequence. Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 8, first, the user registers in advance a password derivation pattern for the user in the check server 12 (S200). For example, the user operates the personal computer 14 or the mobile phone 16 to access the check server 12 and registers a password derivation patter. The password derivation pattern is registered in the check server 12 while being associated with the individual identification information for identifying the mobile phone 16. Alternatively, the user may access the check server 12 from the personal computer 14 or the mobile phone 16 via the site server 10 and register the password derivation pattern.

The "password derivation pattern" refers to a specific element group the user arbitrarily selects from an element group constituting an overall pattern. More specifically, the password derivation pattern is an array pattern or array rule that shows how and which element group was selected from a matrix that is the overall pattern. In short, the password derivation pattern indicates information on how and which element was selected.

Figure 9:
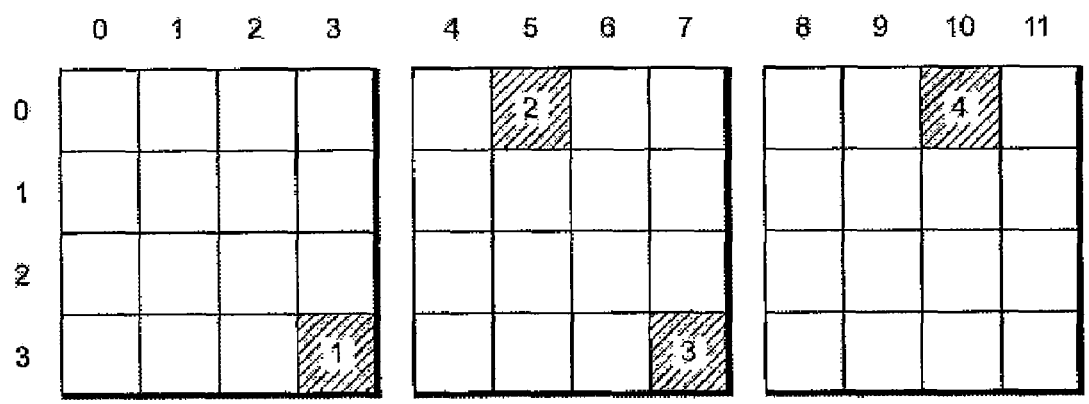
FIG. 9 is a diagram explaining a password derivation pattern.

FIG. 9 is a diagram explaining the password derivation pattern. FIG. 9 is a diagram showing an example in which the overall pattern is a matrix having 4 columns and 12 rows. In FIG. 9, selected elements are shown with hatching and the number indicating the selected order is assigned to each selected element. Accordingly, the password derivation pattern in this case can be expressed as being "(3,3)-(0,5)-(3,7)-(0,10)" using matrix expression.

The password derivation pattern is used for the user authentication in the site server 10, so the user should memorize it. In this sense, the password derivation pattern can be regarded as a certain kind of password. The number and array of elements constituting the password derivation pattern are arbitrary and they are suitably selected in accordance with a security level in the user authentication.

Referring back to FIG. 8, the site server 10 and the check server 12 are time-synchronized in advance (S202). When the user accesses the site server 10 from the personal computer 14 (S204), the site server 10 creates check information based on the access time and the site ID (S206) and transmits an HTML document including this check information to the personal computer 14 (S208). When receiving this HTML document from the site server 10, the personal computer 14 displays a login screen including the check information based on the HTML document (S210).

Figure 10:
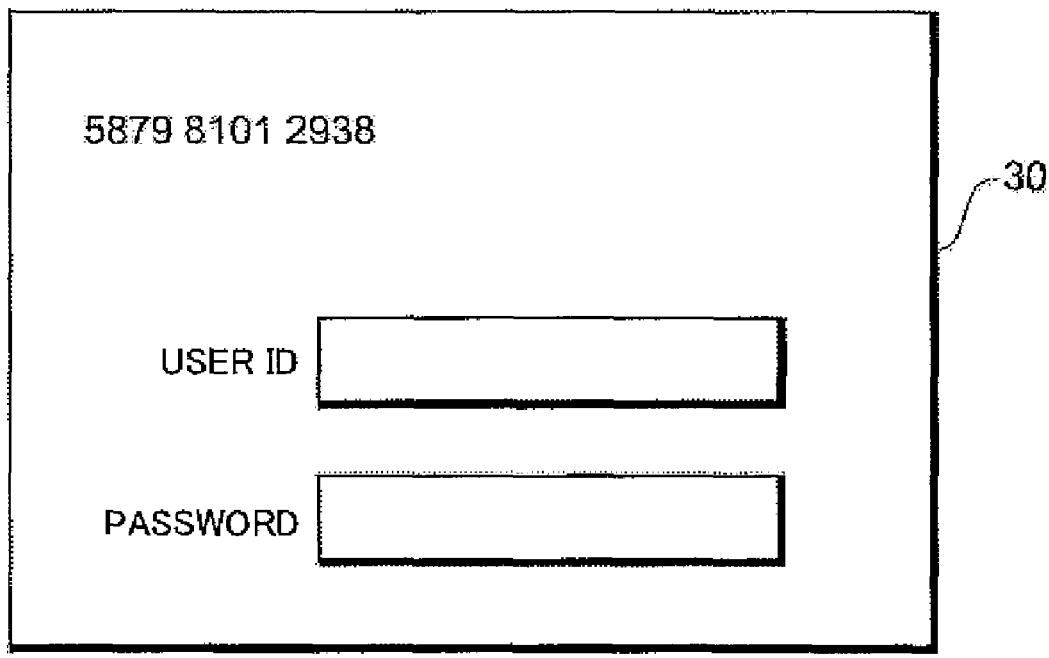
FIG. 10 is a diagram showing an example of a screen displayed on the personal computer 14.

FIG. 10 is a diagram showing an example of a screen displayed on the personal computer 14 in S210. In this embodiment, the check information serves a part of a presentation pattern for the user to extract a password, and the site server 10 creates a 12-digit number string, e.g., "5879 8101 2938," as the check information in S206, while the personal computer 14 displays "5879 8101 2938" in a part of the login screen 30 in S210.

Next, the user transmits the site ID of the site server 10 and the individual identification number of the mobile phone 16 to the check server 12 from the mobile phone 16 (S212). The check server 12 creates check information based on the time the user accessed the check server 12 from the mobile phone 16 and the site ID of the site server 10 (S214). In this embodiment, if the time the user accessed the check server 12 from the mobile phone 16 is the same as the time the user accessed the site server 10 from the personal computer 14, the check server 12 also creates the 12-digit character string, e.g., "5879 8101 2938," as the check information.

The check server 12 then creates the presentation pattern for the user to extract the password (S216). Specifically, the check server 12 creates the presentation pattern by assigning a number to each element in the overall pattern shown in FIG. 9.

In this embodiment, the presentation pattern is created by assigning the created check information to some of the elements in the overall pattern and assigning random numbers generated by calling a predetermined random number function to the remaining elements.

Next, the check server 12 transmits the created presentation pattern to the mobile phone 16 (S218) and the mobile phone 16 displays a screen including the received presentation pattern (S220). Consequently, the user can extract the password from the presentation pattern based on the password derivation pattern and log in to the site managed by the site server 10.

Figure 11:
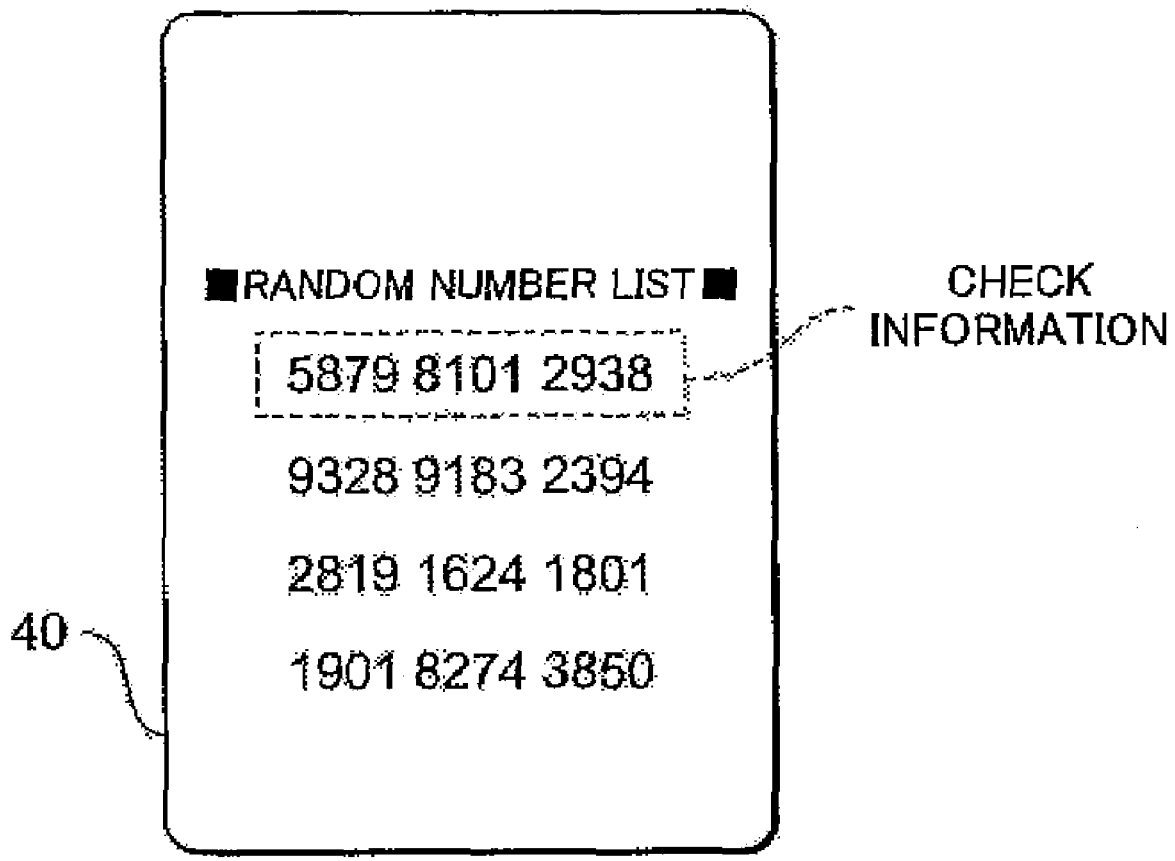
FIG. 11 is a diagram showing an example of the screen 40 displayed on the mobile phone 16.

FIG. 11 shows a diagram showing an example of the screen 40 displayed on the mobile phone 16 in S202. In this embodiment, as shown in FIG. 11, the check information created by the check server 12 is displayed as a part of the presentation pattern in the screen 40.

According to this embodiment, since the check information is displayed as a part of the presentation pattern on the mobile phone 16, the space used in the display of the mobile phone 16 can be reduced This embodiment is particularly advantageous when being applied in an information terminal with a small display unit, e.g., the mobile phone 16.

[Third Embodiment]

In this embodiment, the site server 10 and the check server 12 have the personal computer 14 and the mobile phone 16 display check images as check information. The below description will describe this embodiment, mainly the points different from the first embodiment and second embodiment.

Figure 12:
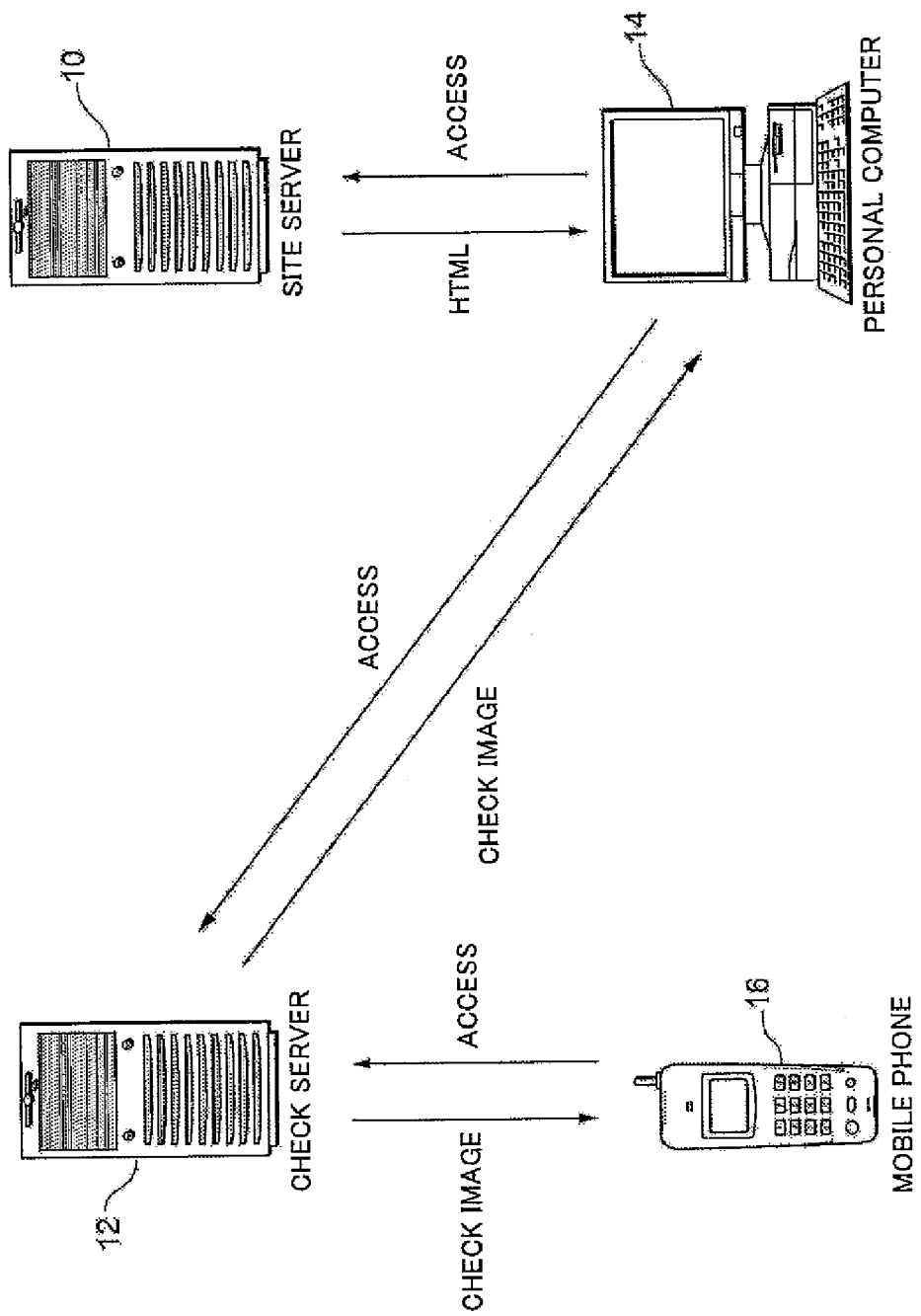
FIG. 12 is a schematic diagram showing a system that performs a site check method according to a third embodiment.

FIG. 12 is a schematic diagram showing a system that executes a site check method according to this embodiment. In the system according to this embodiment, the personal computer 14 is configured so as to enable communication with both the site server 10 and the check server 12.

Figure 13:
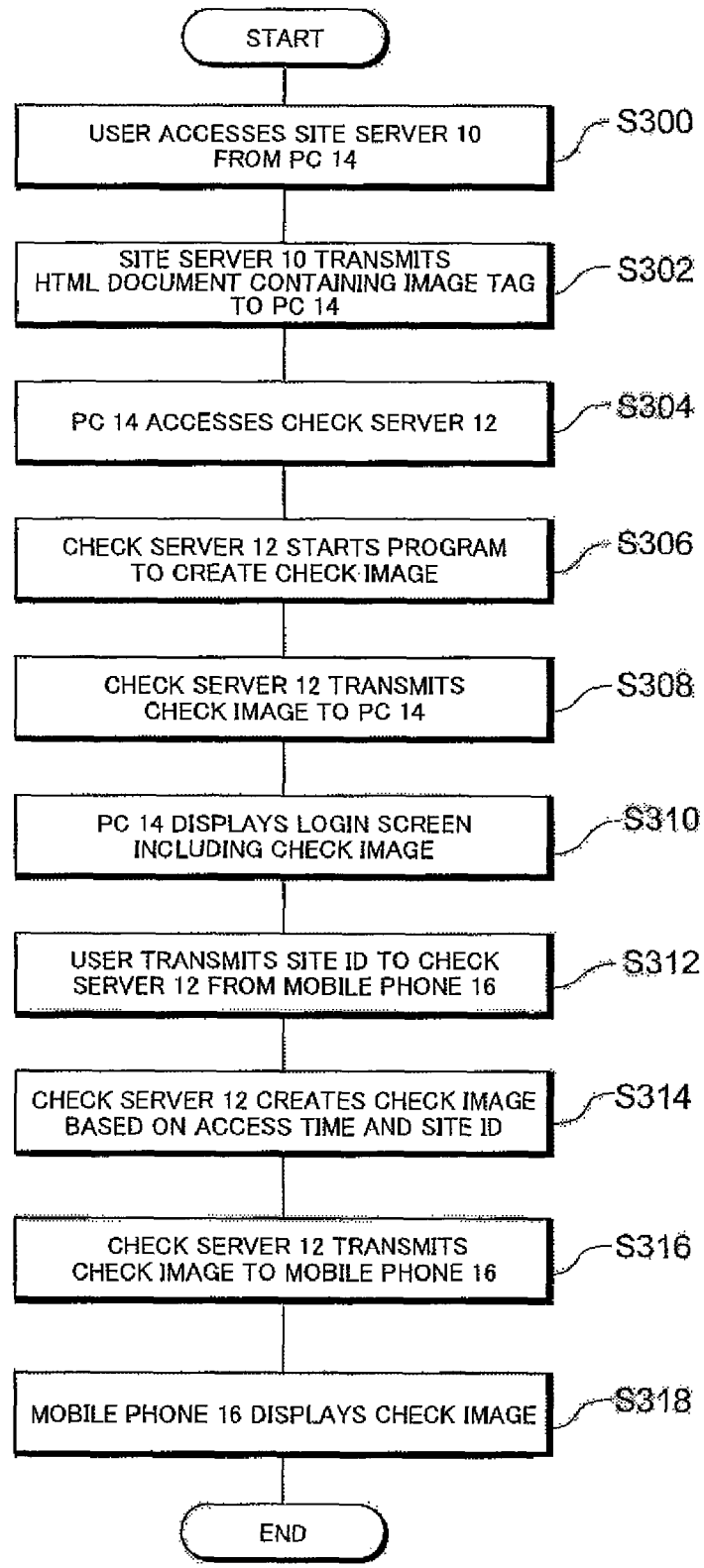
FIG. 13 is a flowchart explaining a processing sequence in the site check method according to the third embodiment.

FIG. 13 is a flowchart explaining a processing sequence in the site check method according to this embodiment. Although the processing is sequentially explained in the below flowchart, the processing is not limited to this sequence.

Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 13, when the user accesses the site server 10 from the personal computer 14 (S300), the site server 10 transmits an HTML document including an image tag to the personal computer 14 (S302).

Specifically, because the check server 12 stores a CGI (Common Gateway Interface) program for creating check images, the site server 10 transmits to the personal computer 14 an image tag, which is an HTTP request message for starting this CGI program. The site server 10 also incorporates the site ID of the site server 10 in the HTTP request message when transmitting this message. An example in which this program is stored in a server other than the check server 12 will be described in another embodiment.

Next, the personal computer 14 accesses the check server 12 and transmits the site ID of the site server 10 to the check server 12 based on the image tag included in the acquired HTML document (S304). The check server 12 starts the program for creating check images and creates a check image (S306). Specifically, the check server 12 creates the check image based on the access time the personal computer 14 accessed the check server 12 and the site ID of the site server 10 that has been transmitted from the personal computer 14. Then the check server 12 transmits the created check image to the personal computer 14 (S308) and the personal computer 14 displays a login screen based on the HTML document transmitted from the site server 10 and the check image transmitted from the check server 12 (S310). If the check server 12 also receives from the personal computer 14 additional information that can identify the user, the check server 12 may create the check information based also on this additional information. With this arrangement, the check server 12 can create unique check information for each user.

Figure 14:
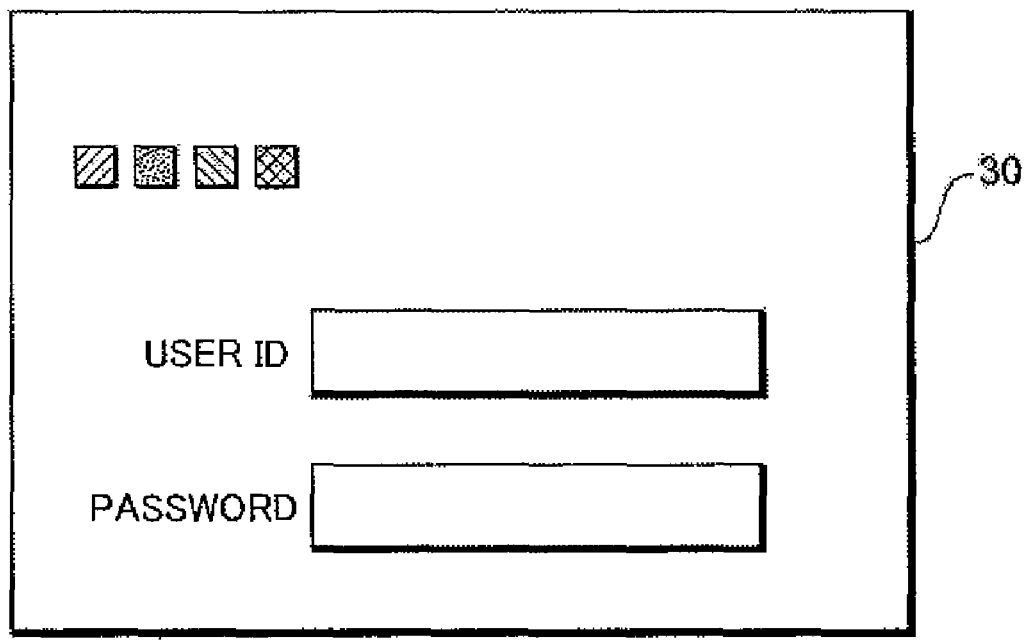
FIG. 14 is a diagram showing an example of a screen displayed on the personal computer 14.

FIG. 14 is a diagram showing an example of a screen displayed on the personal computer 14 in S310. In the example shown in FIG. 14, the HTML document acquired by the personal computer 14 is for displaying the login screen 30, and so the check image created by the check server 12 is displayed in a part of the login screen 30. As can be seen from FIG. 4, the check server 12 has created four rectangular images as the check image, where colors are set respectively for the four rectangular images based on the access time and the site ID (in this figure, the colors of the rectangular images are expressed by hatching). The form of the check image is not limited to these images and the shape of the check image or the content of the check image (e.g., animal images) may be set based on the access time and the site ID. The check image may be an easily recognizable image so that. If the check image displayed on the screen of the personal computer 14 and the check image displayed on the screen of the mobile phone 16 are different from each other, the user can easily recognize the difference.

Referring back to FIG. 13, the user transmits the site ID of the site server 10 to the check server 12 from the mobile phone 16 (S312). The check server 12 then creates a check image based on the access time the user accessed the check server 12 from the mobile phone 16 and the site ID of the site server 10 (S314). In this embodiment, since the check server 12 creates the check image in S314 by the same program as in S306, if the time the user accessed the check server 12 from the mobile phone 16 is the same as the time the user accessed the check server 12 from the personal computer 14, the same check image as in S306 is created. If the check server 12 receives additional information that can identify the user from the mobile phone 16, the check server 12 may create the check information based also on this additional information. With this arrangement, unique check information can be created for each user.

Next, the check server 12 transmits the created check image to the mobile phone 16 (S316) and the mobile phone 16 displays a screen including the received check image (S318).

Figure 15A:
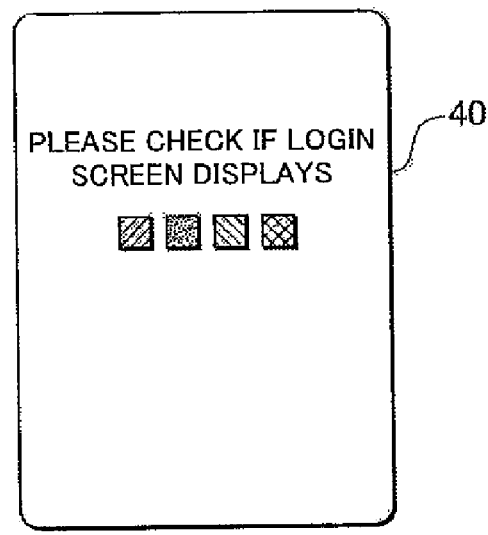
FIG. 15 is a diagram showing an example of a screen displayed on the mobile phone 16.
Figure 15B:
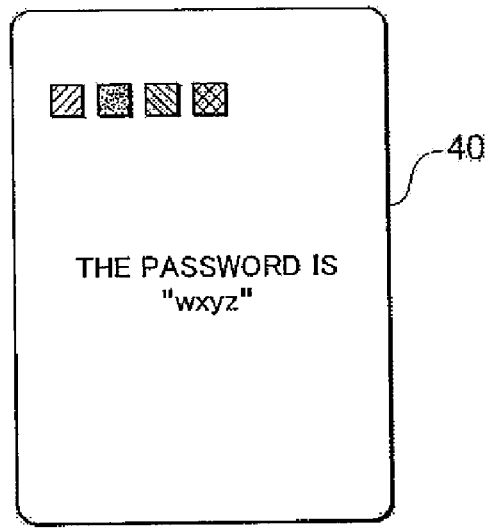
Figure 15C:
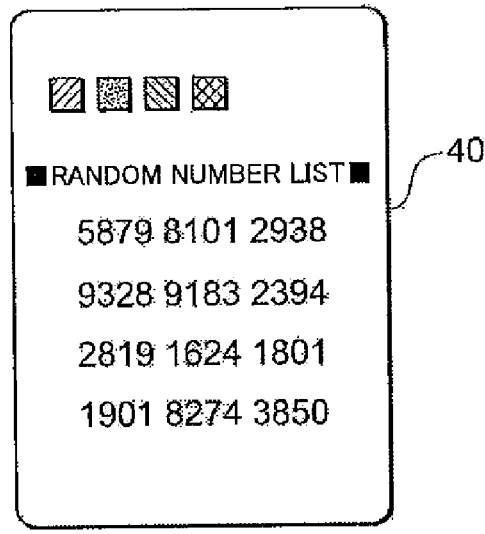

FIG. 15 is a diagram showing an example of the screen displayed on the mobile phone 16 in S318. In the example shown in FIG. 15A, the check image created by the check server 12 is displayed in a part of the screen 40 displayed on the mobile phone 16. Also, as shown in the same figure, the check server 12 may display the screen 40 on the mobile phone 16 so as to prompt the user to check whether or not the same check information is displayed in the login screen 30 (see FIG. 14) on the personal computer 14. In addition, as shown in FIGS. 15B and C, the check server 12 may have the mobile phone 16 also display the password for the user to login the site server 10 from the personal computer 14 or the presentation pattern for the user to extract the password (see the second embodiment) in a part of the screen 40 on the mobile phone 16.

Although the site server 10 and the check server 12 have the personal computer 14 and the mobile phone 16 display the check images as check information in this embodiment, one of the site server 10 and the check server 12 may have the relevant personal computer 14 or mobile phone 16 display an image (check image) that enables the user to recognize a letter string or a number string while the other may have the relevant personal computer 14 or mobile phone 16 display that letter string or number string as text. With this arrangement, the amount of data to be transmitted from the site server 10 and the check server 12 to the personal computer 14 and the mobile phone 16 can be reduced. In addition, the check image can be prevented from being copied in real time and used by a phishing site.

According to this embodiment, since images are displayed as check information on the personal computer 14 and the mobile phone 16, the user can check whether the site the user has accessed is legitimate or not even more easily.

In addition, according to this embodiment, the site server 10 can check the site the user has accessed simply by changing the HTML document to be transmitted to the personal computer 14 thereby providing a site check method that can be introduced and maintained even more easily.

[Fourth Embodiment]

In this embodiment, in addition to the features of the third embodiment, the check server 12 stores in advance a URL managed by the site server 10 and checks whether the site server 10 is legitimate or not. The below description will describe this embodiment, mainly the points different from the first to third embodiments. The system in this embodiment has the same configuration as the system shown in FIG. 12.

Figure 16:
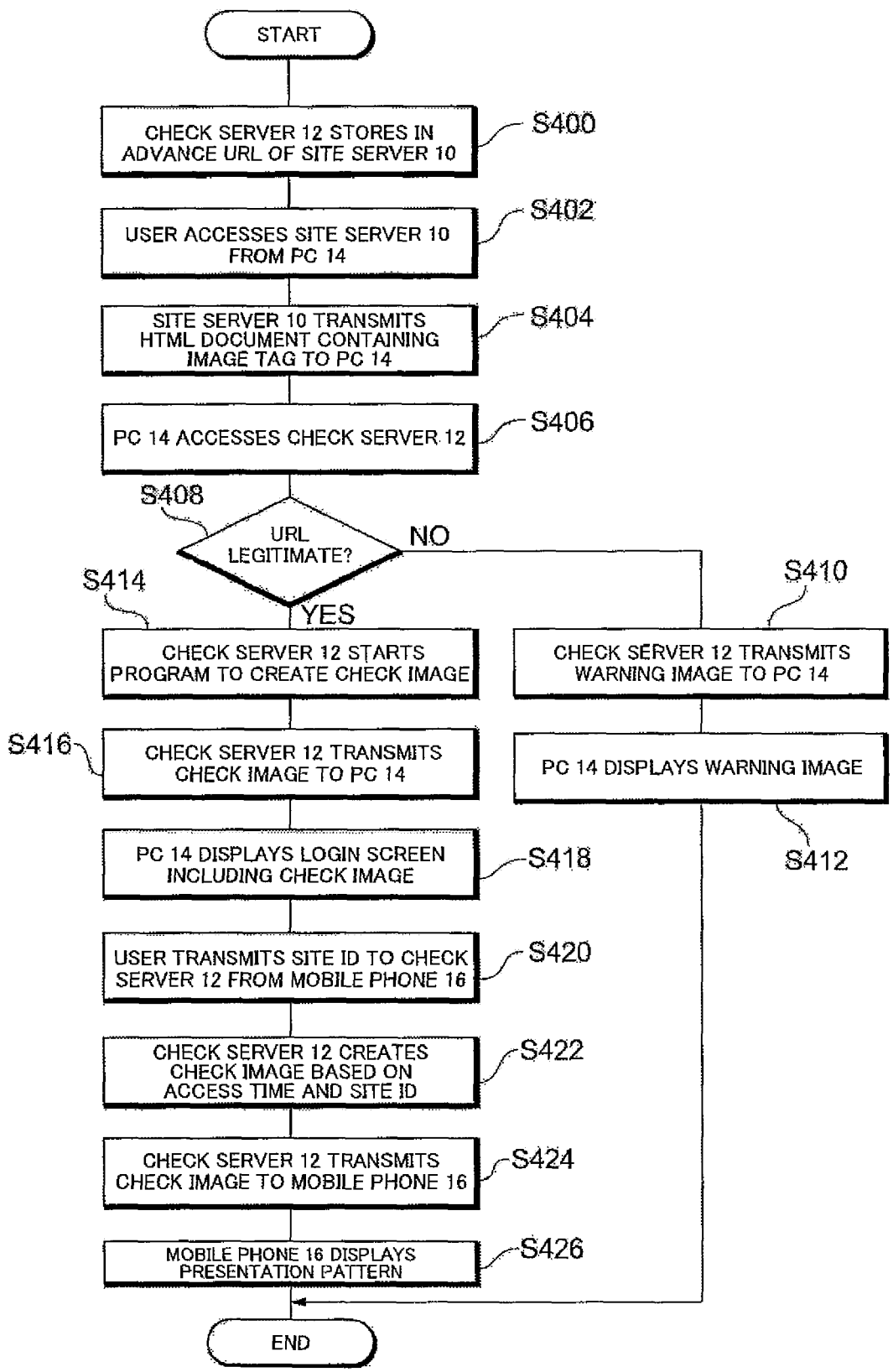
FIG. 16 is a flowchart explaining a processing sequence in a site check method according to a fourth embodiment.

FIG. 16 is a flowchart explaining a processing sequence in a site check method according to this embodiment. Although the processing is sequentially explained in the below flowchart, the processing is not limited to this sequence. Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 16, the check server 12 stores in advance the URL (Uniform Resource Locater) of the site server 10 (S400). When the user accesses the site server 10 from the personal computer 14 (S402), the site server 10 transmits an HTML document including an image tag to the personal computer 14, like in the third embodiment (S404).

Next, the personal computer 14 accesses the check server 12 based on the image tag included in the acquired HTML document (S406). Specifically, the personal computer 14 transmits to the check server 12 REFERRER data indicating that the HTML document containing the relevant image tag has been received from the site server 10. The REFERRER data contains the URL of the site managed by the site server 10 and the URL of this site is transmitted to the check server 12.

The check server 12 then checks whether the URL contained in the REFERRER data received from the personal computer 14 is legitimate or not (S408).

Specifically, the check server 12 checks whether or not the URL received from the personal computer 14 matches the URL that has been stored in advance in the check server 12. If they do not match each other, the check server 12 determines that the site managed by the site server 10 is not legitimate (S408: No). Then the check server 12 transmits, instead of the check image, a warning image warning that the site the user has accessed from the personal computer 14 might not be legitimate (S410), and the personal computer 14 displays the received warning image (S412).

Figure 17:
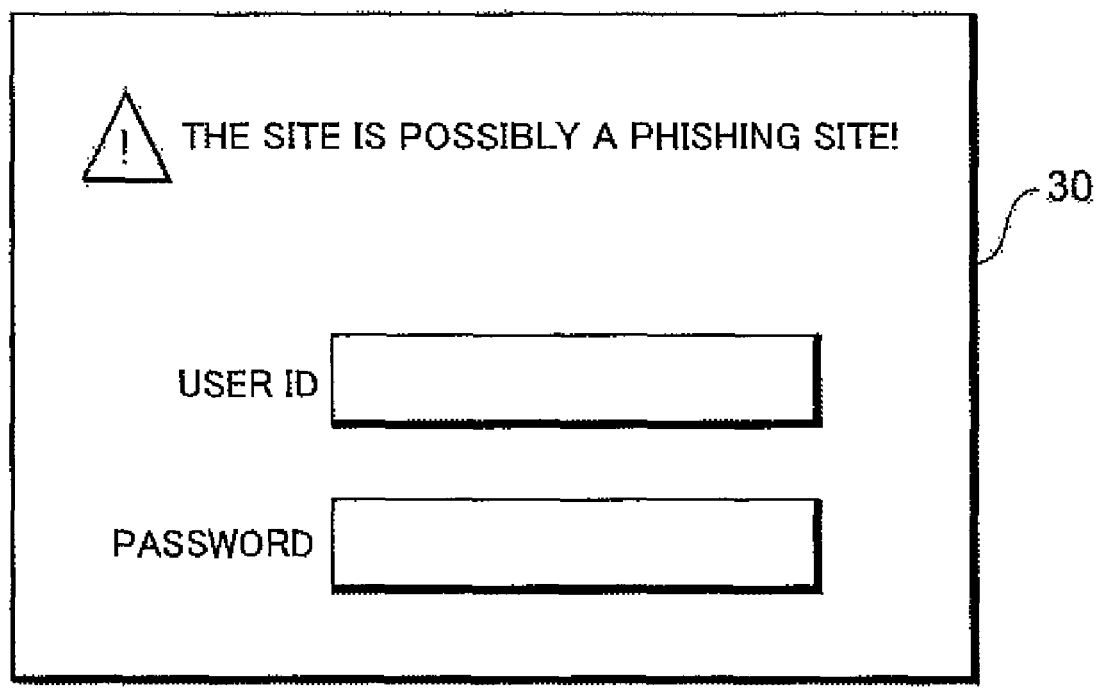
FIG. 17 is a diagram showing an example of a screen displayed on the personal computer 14.

FIG. 17 shows an example of a screen displayed on the personal computer 14 in S412. In the example shown in FIG. 17, the HTML document received by the personal computer 14 is for displaying the login screen 30, and the warning image transmitted from the check server 12 is displayed in a part of the login screen 30 instead of the check image.

On the other hand, if the URL received from the personal computer 14 matches with the URL that has been stored in advance in the check server 12, the check server 12 determines that the site managed by the site server 10 is legitimate (S408: Yes). Then, like in the third embodiment (FIG. 13, S306 to S318), the check image is displayed on the mobile phone 16 (S414 to S426).

According to this embodiment, since the check server 12 checks the URL from which the personal computer 14 has received the HTML document, even if there is a phishing site between the site server 10 and the personal computer 14, the user can properly check whether or not the site the user has accessed is legitimate.

In addition, according to this embodiment, since the check image and the warning image are displayed using data typically transmitted/received by a browser, a site check method that can be introduced even less expensively can be provided.

[Fifth Embodiment]

In this embodiment, an image server 18 instead of the check server 12 creates a check image. The below description will describe this embodiment, mainly the points different from the first to fourth embodiments.

Figure 18:
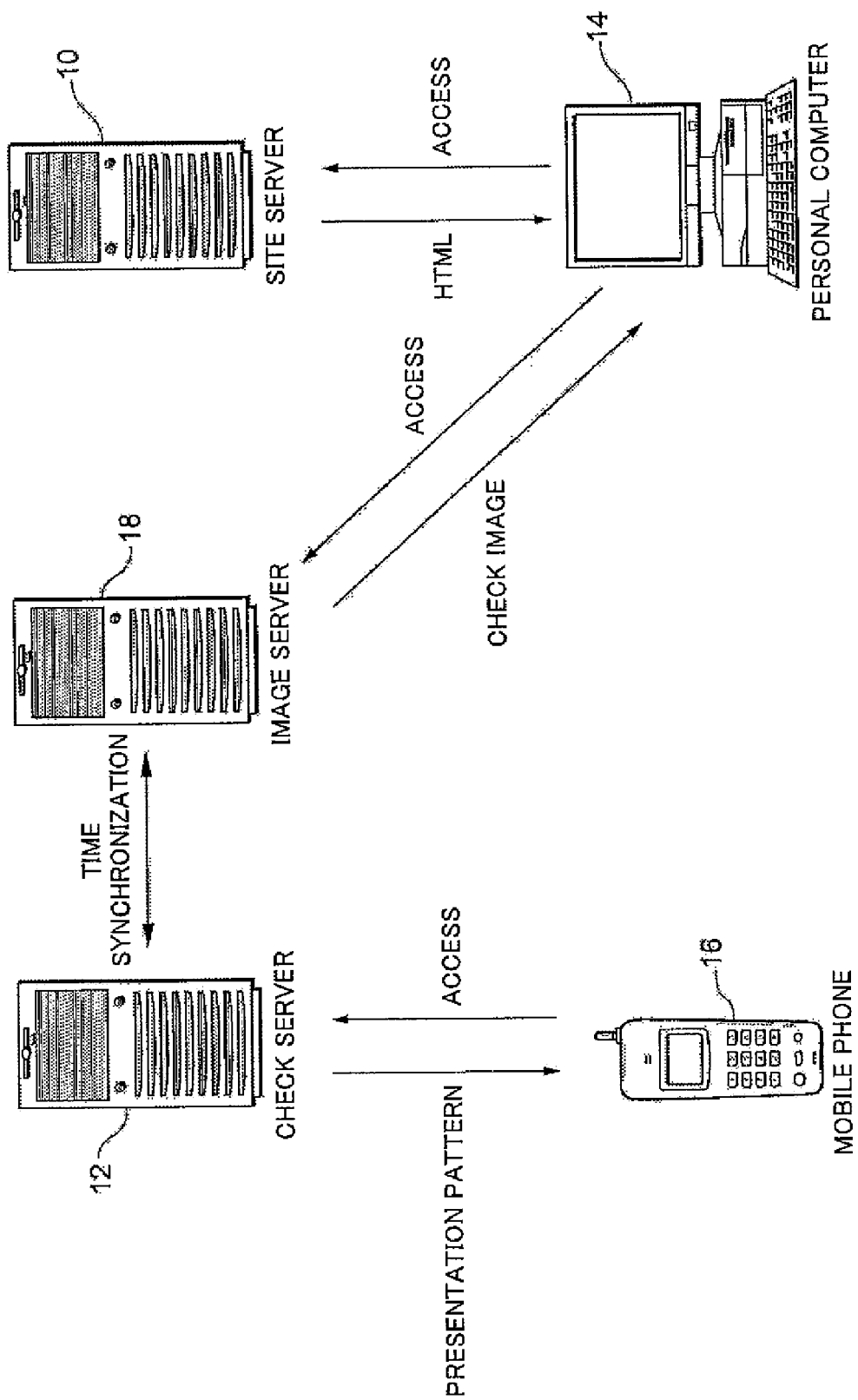
FIG. 18 is a schematic diagram showing a system that performs a site check method according to a fifth embodiment.

FIG. 18 is a schematic diagram showing a system that performs a site check method according to this embodiment. The system in this embodiment further includes an image server 18 that can be time-synchronized with the check server 12.

The image server 18 is connected to the personal computer 14 so as to enable communication between them.

Figure 19:
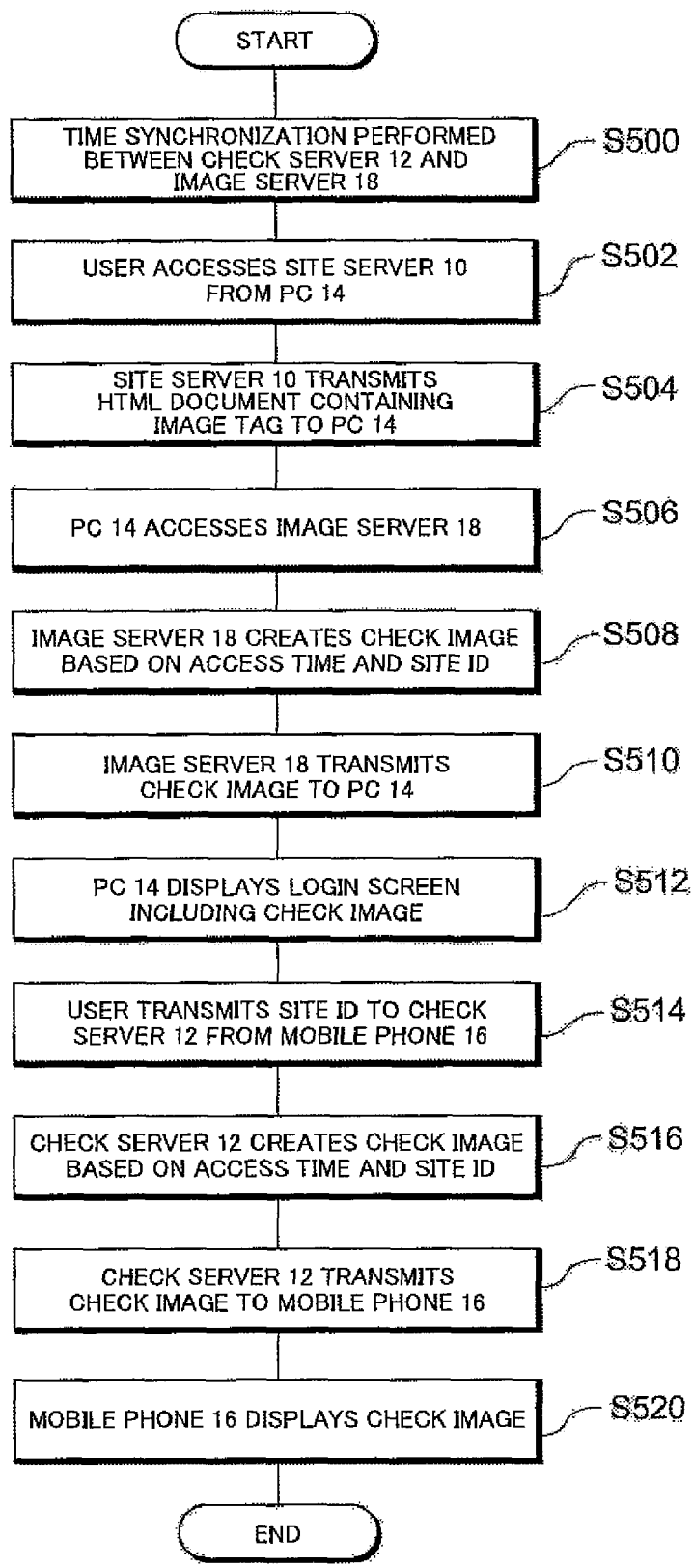
FIG. 19 is a flowchart explaining a processing sequence in the site check method according to the fifth embodiment.

J FIG. 19 is a flowchart explaining a processing sequence in the site check method according to this embodiment. Although the processing is sequentially explained in the below flowchart, the processing is not limited to this sequence.

Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 19, the check server 12 and the image server 18 synchronize in advance the times of their internal timers (S500). When the user accesses the site server 10 from the personal computer 14 (S502), the site server 10 transmits an HTML document including an image tag to the personal computer 14 (S504).

Specifically, because the image server 18 stores a CGI (Common Gateway Interface) program for creating check images, the site server 10 transmits to the personal computer 14 an image tag, which is an HTTP request message for starting this CGI program. The site server 10 incorporates the site ID of the site server 10 in the HTTP request message when transmitting this message.

Next, the personal computer 14 accesses the image server 18 based on the image tag included in the received HTML document and transmits the site ID of the site server 10 to the image server 18 (S506). The image server 18 starts the program for creating check images and creates a check image. Specifically, the image server 18 creates the check image based on the time the personal computer 14 accessed the image server 18 and the site ID of the site server 10 transmitted from the personal computer 14. The image server 18 transmits the created check image to the personal computer 14 (S510), and the personal computer 14 displays a login screen based on the HTML document transmitted from the site server 10 and the check image transmitted from the image server 18 (S512).

Next, the user transmits the site ID of the site server 10 to the check server 12 from the mobile phone 16 (S514). The check server 12 creates a check image based on the time the user accessed the check server 12 from the mobile phone 16 and the site ID of the site server 10 (S516). In this embodiment, since the check server 12 creates the check image in S516 by the same program as in S508, if the time the user accessed the check server 12 from the mobile phone 16 is the same as the time the user accessed the image server 18 from the personal computer 14, the same check image as that in S508 is created. Then the check server 12 transmits the created check image to the mobile phone 16 (S518), and the mobile phone 16 displays the screen including the received check image (S520).

According to this embodiment, since the image server 18 creates the check image and has the personal computer 14 display the image, the load on the site server 10 and/or the check server 12 can be reduced.

[Sixth Embodiment]

In this embodiment, the site server 10 checks with the check server 12 whether the mobile phone 16 has accessed the check server 12 using the site ID of the site server 10. The following description will describe this embodiment, mainly the points different from those of the first to fifth embodiments.

Figure 20:
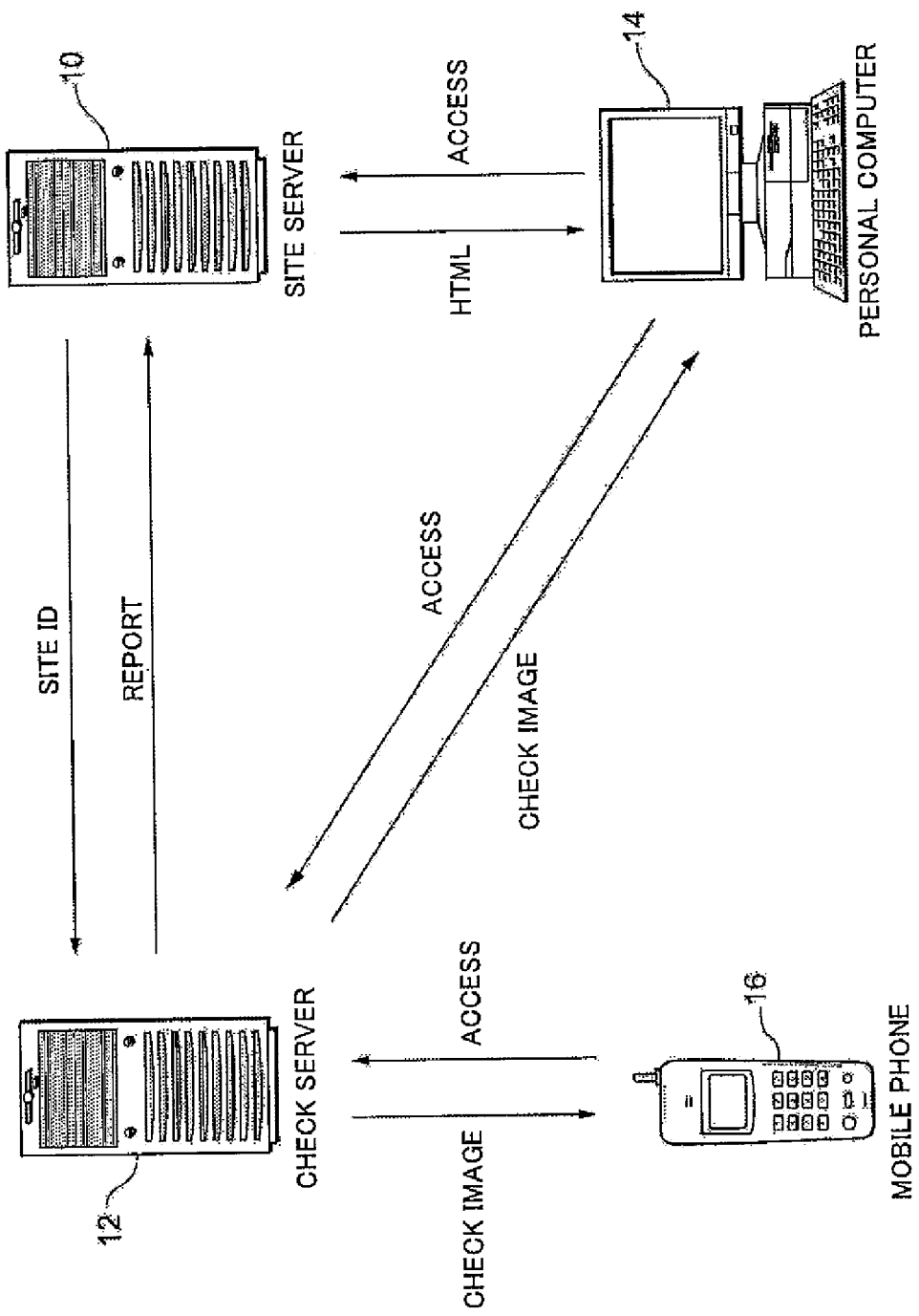
FIG. 20 is a schematic diagram showing a system that performs a site check method according to a sixth embodiment.

FIG. 20 is a schematic diagram showing a system that performs a site check method according to this embodiment. The system in this embodiment is configured so as to enable communication with the site server 10 and the check server 12.

Figure 21:
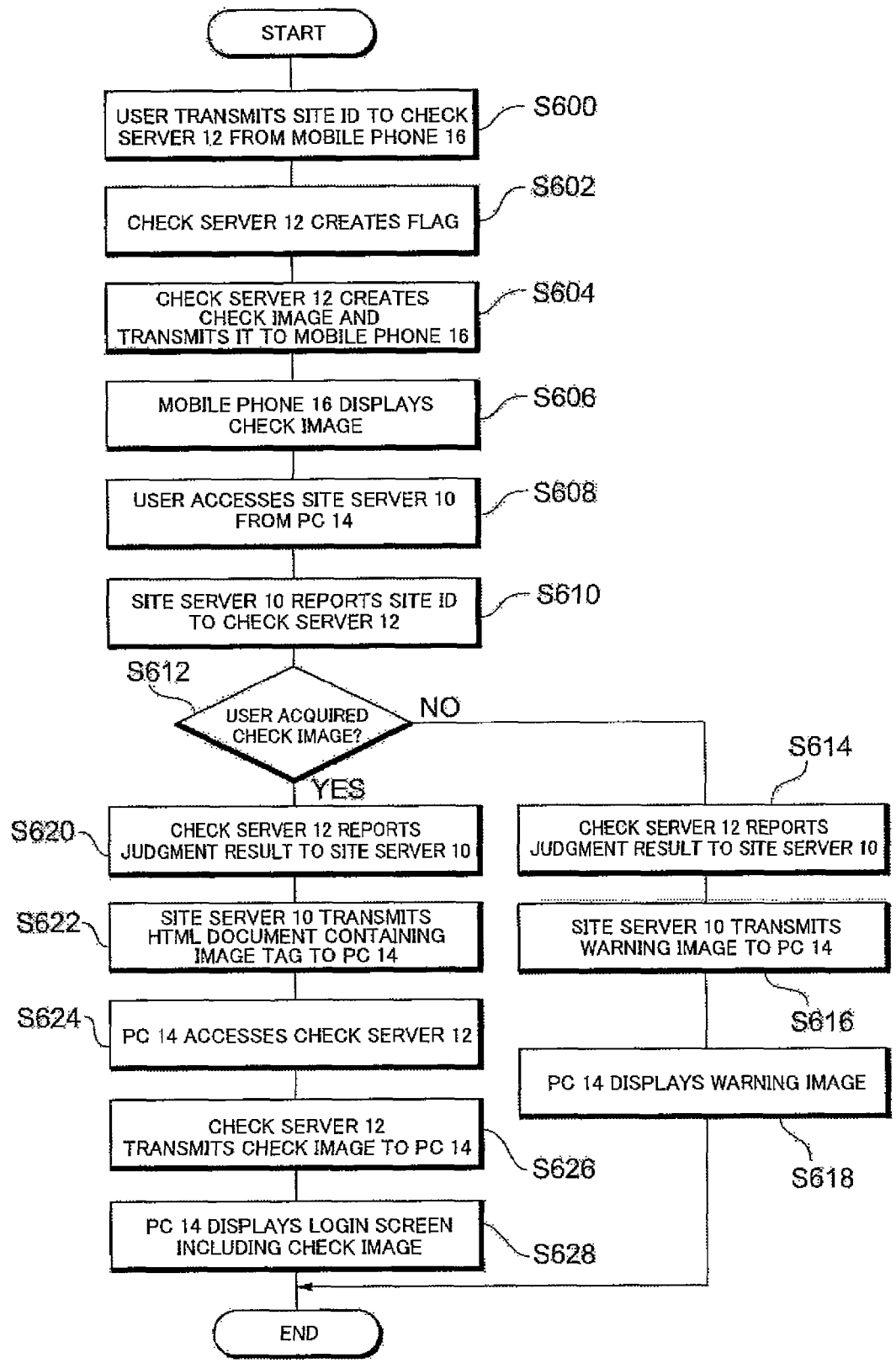
FIG. 21 is a flowchart explaining a processing sequence in the site check method according to the sixth embodiment.

FIG. 21 is a flowchart explaining a processing sequence of the site check method according to this embodiment. Although the processing is sequentially explained in the below flowchart, the processing is not limited to this sequence.

Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 21, the user accesses the check server 12 from the mobile phone 16 and transmits the site ID of the site server 10 to the check server 12 from the mobile phone 16 (S600). When receiving the site ID from the mobile phone 16, the check server 12 creates a flag for this site ID and stores the fact that the mobile phone 16 has accessed the check server 12 using this site ID (S602).

In S600, the mobile phone 16 may also transmit to the check server 12 information that can identify the mobile phone 16 or the user, e.g., an individual identification number for identifying the mobile phone 16 or a user ID. In such a case, the check server 12 may associate[[s]] this information and the site ID with the flag during the storage in S602. With this arrangement, since the check server 12 can store the fact that an access was made from the relevant user to the check server 12 using the relevant ID, the check server 12 can check whether an access has been made to the check server 12 for each mobile phone 16 or for each user. Furthermore, the check server 12 may delete a flag after a predetermined time period since the creation of the flag.

Next the check server 12 creates a check image based on the time the user accessed the check server 12 from the mobile phone 16 and the site ID of the site server 10 and transmits the created check image to the mobile phone 16 (S604), and the mobile phone 16 displays the received check image (S606).

When the user accesses the site server 10 from the personal computer 14 (S608), the site server 10 transmits the site ID of the site server 10 to the check server 12 and checks whether or not the check image has been acquired for this site ID (S610).

If whether or not access has been made to the check server 12 is checked for each mobile phone 16 or for each user, the site server 10 may also receive from the personal computer 14 additional information that can identify the mobile phone 16 or the user and transmit the additional information together with the site ID to the check server 12.

The check server 12 then checks whether or not the flag has been created for the site ID received from the site server 10 (S612). Here, if the check server 12 receives from the site server 10 information that can identify the mobile phone 16 or the user, the check server 12 checks whether or not a flag indicating that access has been made to the check server 12 using the relevant ID from the relevant user has been created. If the flag has not been created (S612: No), the check server 12 reports that to the site sever 10 (S614). The site server 10 then transmits a warning image to the personal computer 14 (S616), and the personal computer 14 displays the received warning image (S618) to prompt the user to first access the check server 12 from the mobile phone 16 and acquire the check image before accessing the site server 10.

On the other hand, if the flag has been created for the relevant site ID in the check server 12 (S612; Yes), the check server 12 reports that to the site server 10 (S620) and the login screen including the check image is displayed on the personal computer 14 (S622 to S628) like in the third embodiment (FIG. 13, S302 to S310).

If the check server 12 stores the information that can identify the mobile phone 16 or the user (e.g., a user ID) associated with the site ID, the check server 12 may also transmit this information to the site server 10 in S620. In this case, the personal computer 14 may also display this received information in the login screen.

According to this embodiment, when the mobile phone 16 acquires the check image, the check server 12 creates a flag for the relevant site ID, the user is prompted to access the check server 12 from the mobile phone 16 and to acquire the check image. Accordingly, the user can be prevented from failing to acquire the check information and accessing a phishing site

[Seventh Embodiment]

In this embodiment, domain information indicating the range of a domain used by a user is registered in advance in the check server 12 and when the user accesses the site server 10 from the personal computer 14, the site server 10 checks whether or not the domain of the personal computer 14 is within the range of the domain information registered in the check server 12. The below description will describe this embodiment, mainly the points different from the first to sixth embodiments.

Figure 22:
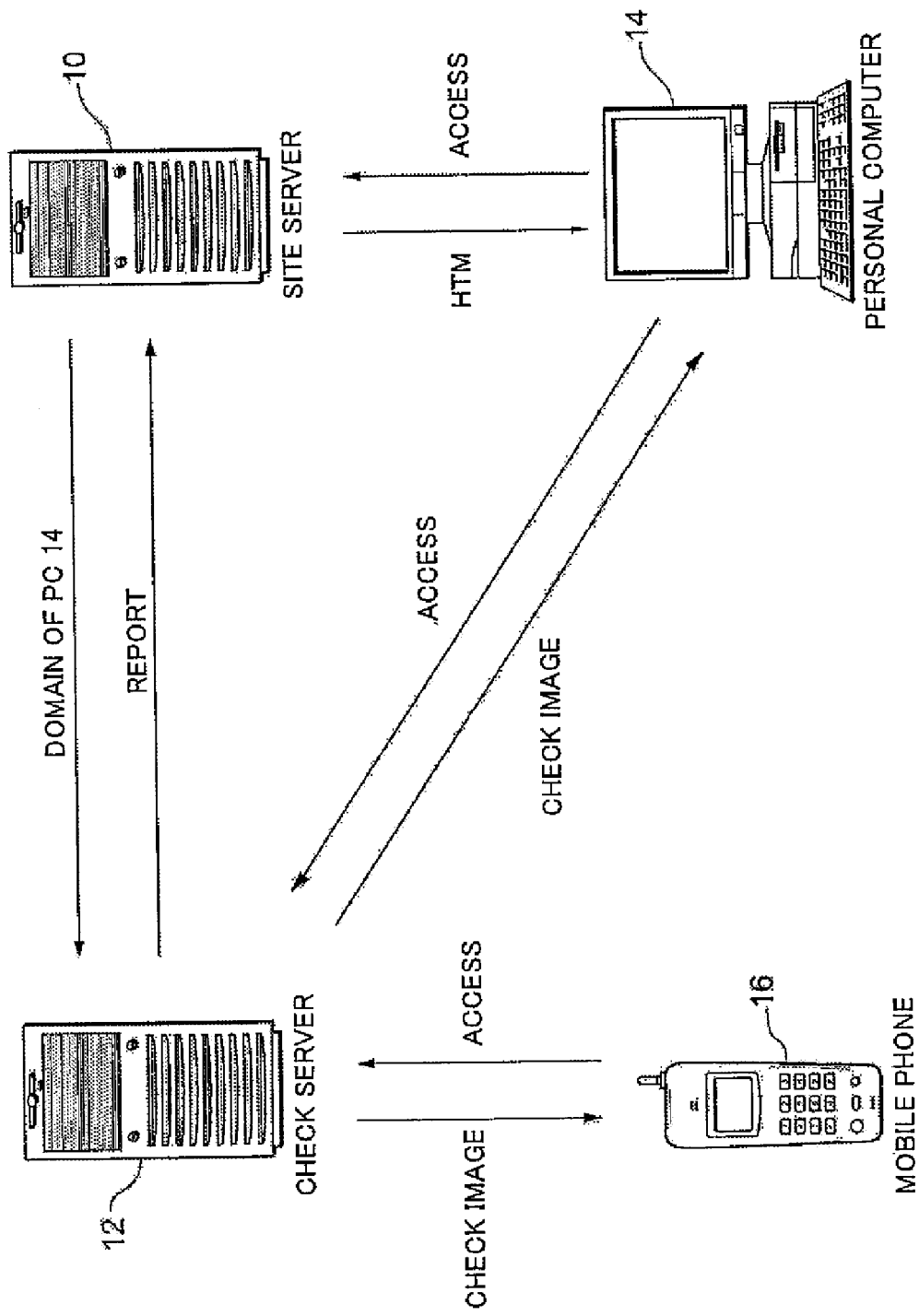
FIG. 22 is a schematic diagram showing a system that performs a site check method according to a seventh embodiment.

FIG. 22 is a schematic diagram showing a system that performs a site check method according to this embodiment. The system in this embodiment is configured so as to enable communication with the site server 10 and the check server 12.

Figure 23:
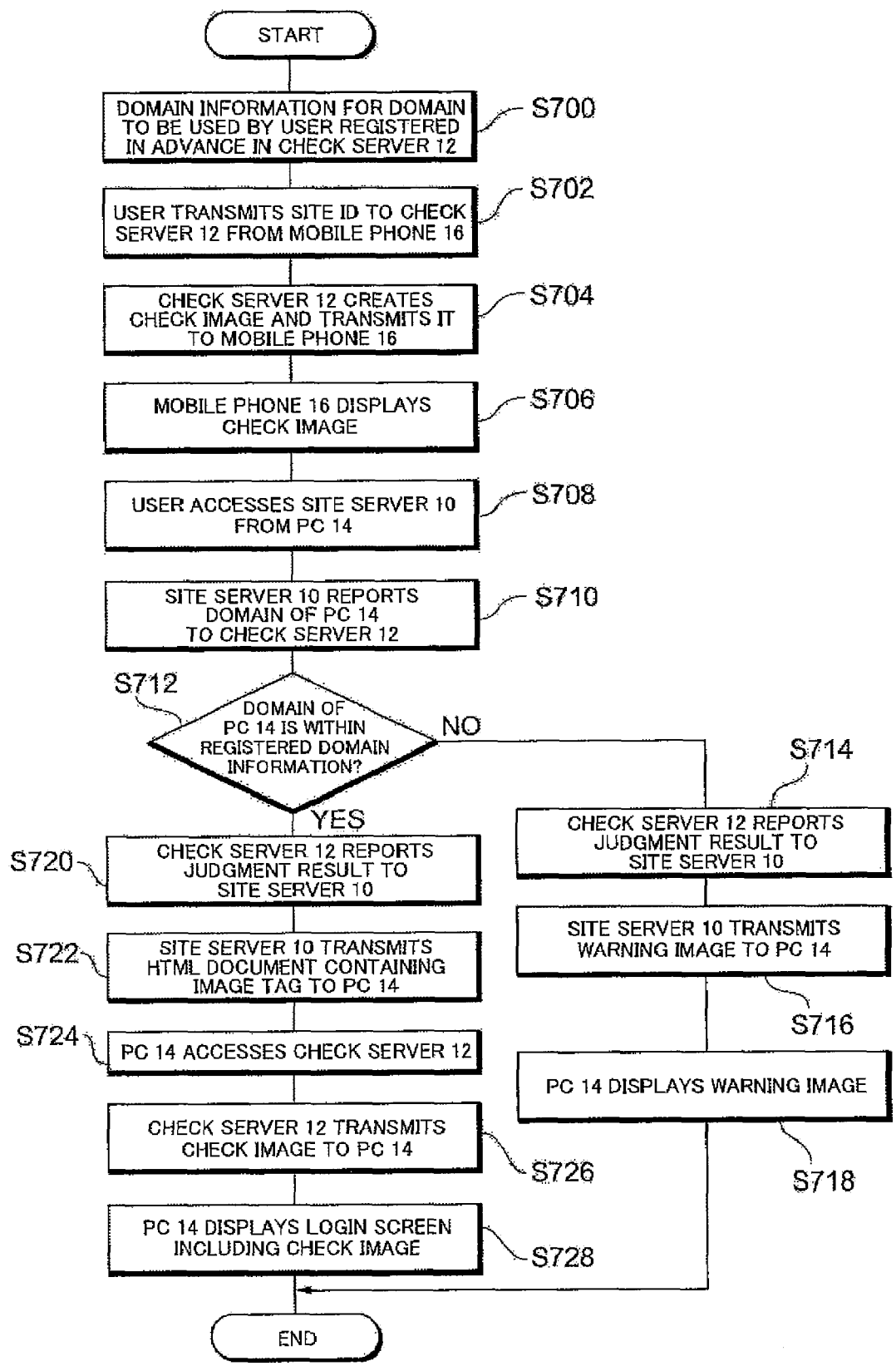
FIG. 23 is a flowchart explaining a processing sequence in the site check method according to the seventh embodiment.

FIG. 23 is a flowchart explaining a processing sequence in the site check method according to this embodiment. Although the processing is sequentially explained in the below flowchart, the processing is not limited to this sequence.

Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 23, the check server 12 stores in advance domain information indicating a domain used by the user (S700). The domain used by the user may include the domain of a company that owns the network the personal computer 14 is connected to, (the domain of an ISP (Internet Service Provider) the user uses from the personal computer 14, or something similar. Here, the check server 12 may associate, with the domain information, information that can identify the user, and store both pieces of information in advance.

Next, the user accesses the check server 12 from the mobile phone 16 and transmits the site ID of the site server 10 to the check server 12 from the mobile phone 16 (S702). The check server 12 creates a check image based on the time the user accessed the check server 12 from the mobile phone 16 and the site ID of the site server 10 and transmits the created check image to the mobile phone 16 (S704), and the mobile phone 16 displays the received check image (S706).

When the user accesses the site server 10 from the personal computer 14 (S708), the site server 10 acquires the domain from the personal computer 14 and transmits this domain to the check server 12 (S710).

The check server 12 checks whether or not the domain received from the site server 10 is within the range of the domain information having been registered in advance (S712). If the received domain is out of the range (S712: No), the check server 12 reports that to the site server 10 (S714). Then the site server 10 transmits a warning image to the personal computer 14 (S716), and the personal computer 14 displays the received warning image (S718) and reports to the user that there might be an illegitimate site such as a phishing site between the personal computer 14 and the site server 10.

On the other hand, if the domain received from the site server 10 is within the range of the domain information having been registered in advance (S712: Yes), the check server 12 reports that to the site server 10 (S720), and the login screen including the check image is displayed on the personal computer 14 (S722 to S728) like in the third embodiment (FIG. 13: S302 to S310).

According to this embodiment, since the check server 12 stores in advance the domain used by the user and compares it with the domain acquired from the site server 10, even if there is a phishing site between the site server 10 and the personal computer 14, the user can properly check whether the site the user has accessed is legitimate or not.

When whether or not an access has been made to the check server 12 is checked for each user, the site server 10 may have the personal computer 14 to transmit to the check server 12 the information for identifying the user in S724.

Then the check server 12 further checks whether or not the information received from the personal computer 14 and the domain received from the site server 10 match the information for identifying the user and the domain which have been associated with each other. If they do not match each other, the check server 12 may transmit a warning image to the personal computer 14.

In addition, although the check server 12 registers the domain range in advance and checks whether or not the domain of the personal computer 14 is within this range in this embodiment, the range of IP addresses may be registered in advance instead of the domain range and the check server 12 may check whether or not the IP address of the personal computer 14 is within this IP address range.

[Eighth Embodiment]

In this embodiment, a user accesses the check server 12 from the personal computer 14 instead of from the mobile phone 16 to acquire a check image. In other words, check images are respectively displayed in plural screens (e.g., browser windows) displayed on the personal computer 14 in this embodiment. The below description will describe this embodiment, mainly the points different from the first to seventh embodiments.

Figure 24:
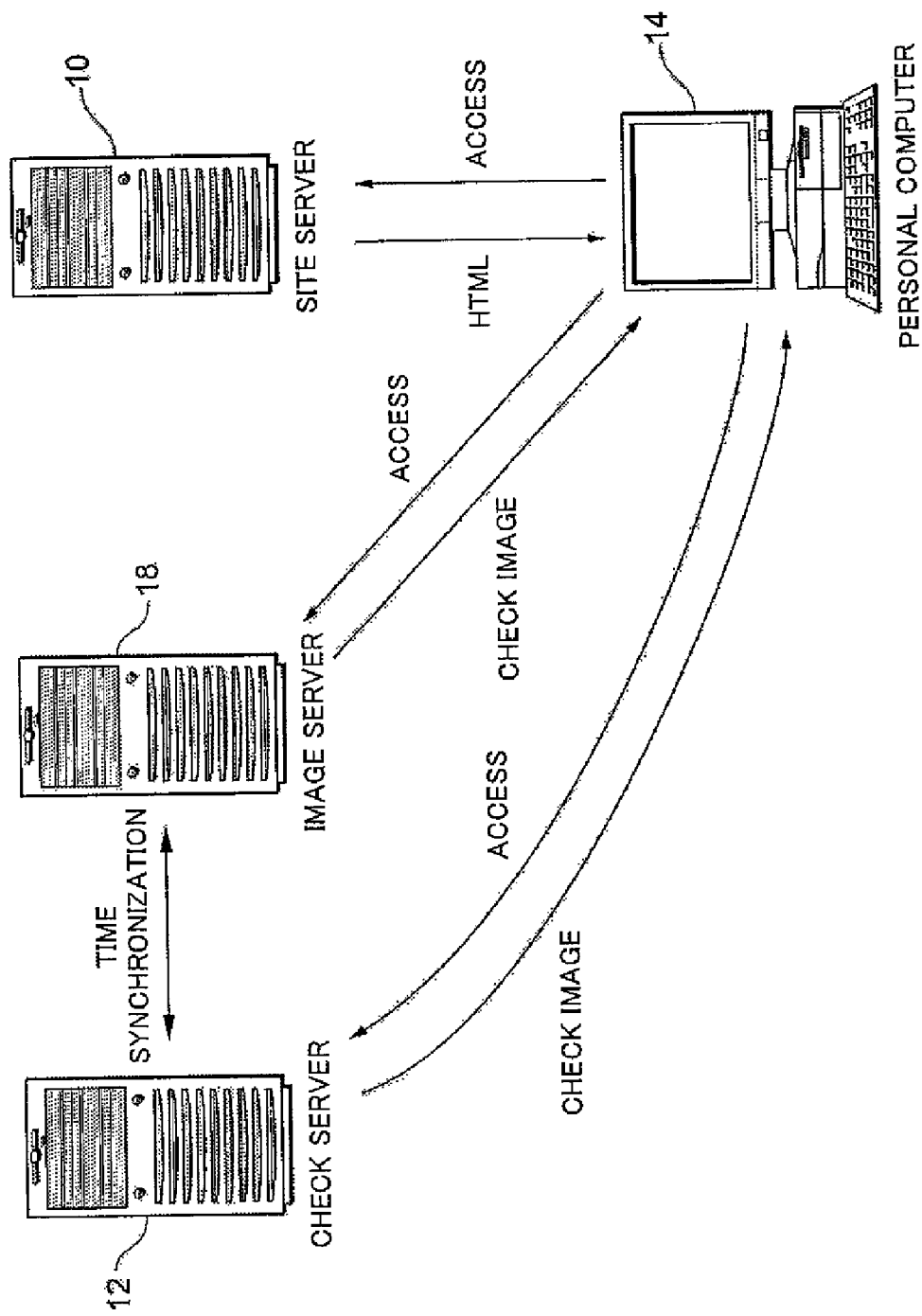
FIG. 24 is a schematic diagram showing a system that performs a site check method according to an eighth embodiment.

FIG. 24 is a schematic diagram showing a system that performs a site check method according to this embodiment. In the system in this embodiment, the personal computer 14 is configured so as to enable communication with the site server 10, the check server 12 and the image server 18.

Figure 25:
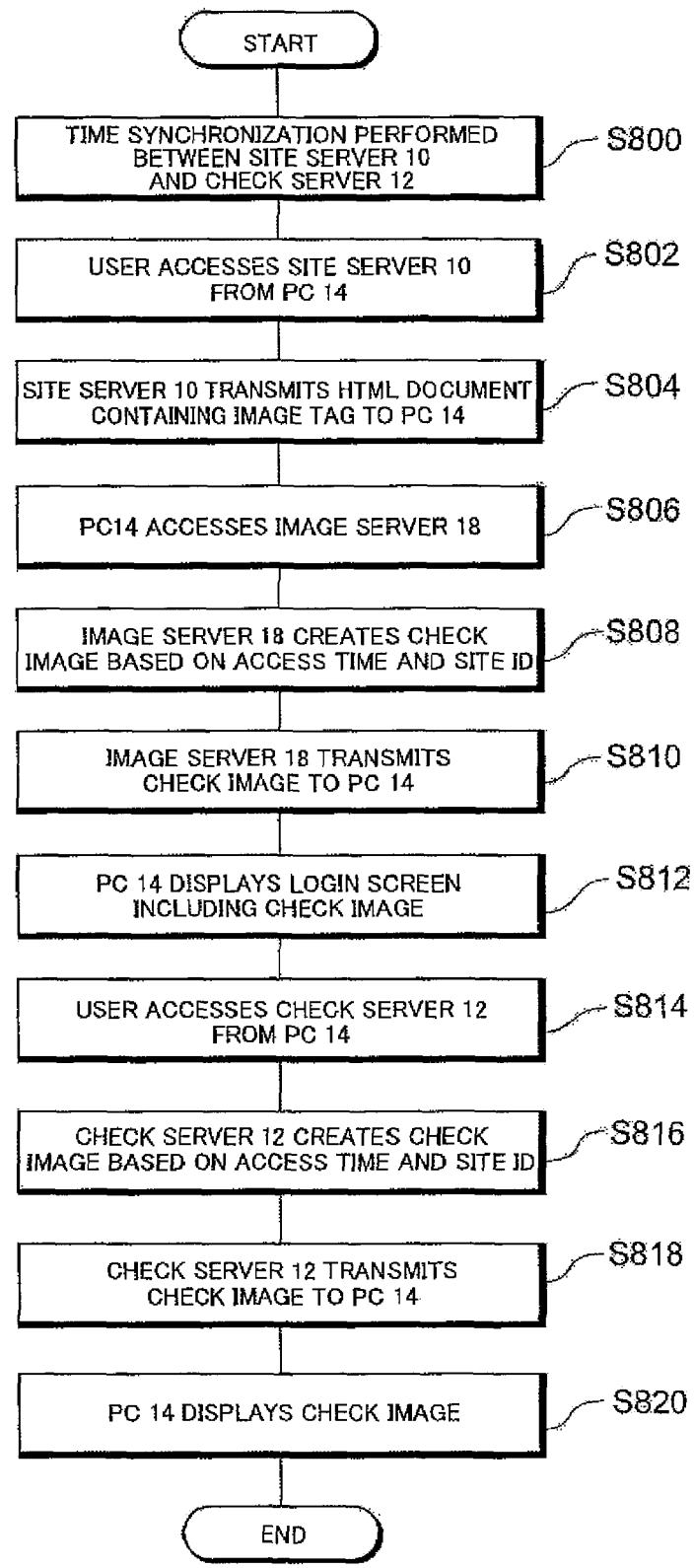
FIG. 25 is a flowchart explaining a processing sequence in the site check method according to the eighth embodiment.

FIG. 25 is a flowchart explaining a processing sequence in the site check method according to this embodiment. Although the processing is sequentially explained in the below flowchart, the processing is not limited to this sequence.

Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 25, the check server 12 and the image server 18 synchronize in advance the times of their internal timers (S800). When the user accesses the site server 10 from the personal computer 14 (S802), the site server 10 transmits an HTML document including an image tag to the personal computer 14 (S804).

Specifically, because the image server 18 stores a CGI program for creating check images, the site server 10 transmits to the personal computer 14 the image tag, which is an HTTP request message for starting the CGI program. The site server 10 incorporates the site ID of the site server 10 in this HTTP request message when transmitting the message.

Next, the personal computer 14 accesses the image server 18 based on the image tag contained in the acquired HTML document and transmits the site ID of the site server 10 to the image server 18 (S806). The image server 18 then starts the program for creating check images and creates a check image (S808). Specifically, the image server 18 creates the check image based on the time the personal computer accessed the image server 18 and the site ID of the site server 10 transmitted from the personal computer 14. Then the image server 18 transmits the created check image to the personal computer 14 (S810), and the personal computer 14 displays a login screen on its own display unit based on the HTML document transmitted from the site server 10 and the check image transmitted from the image server 18 (S812).

Figure 26:
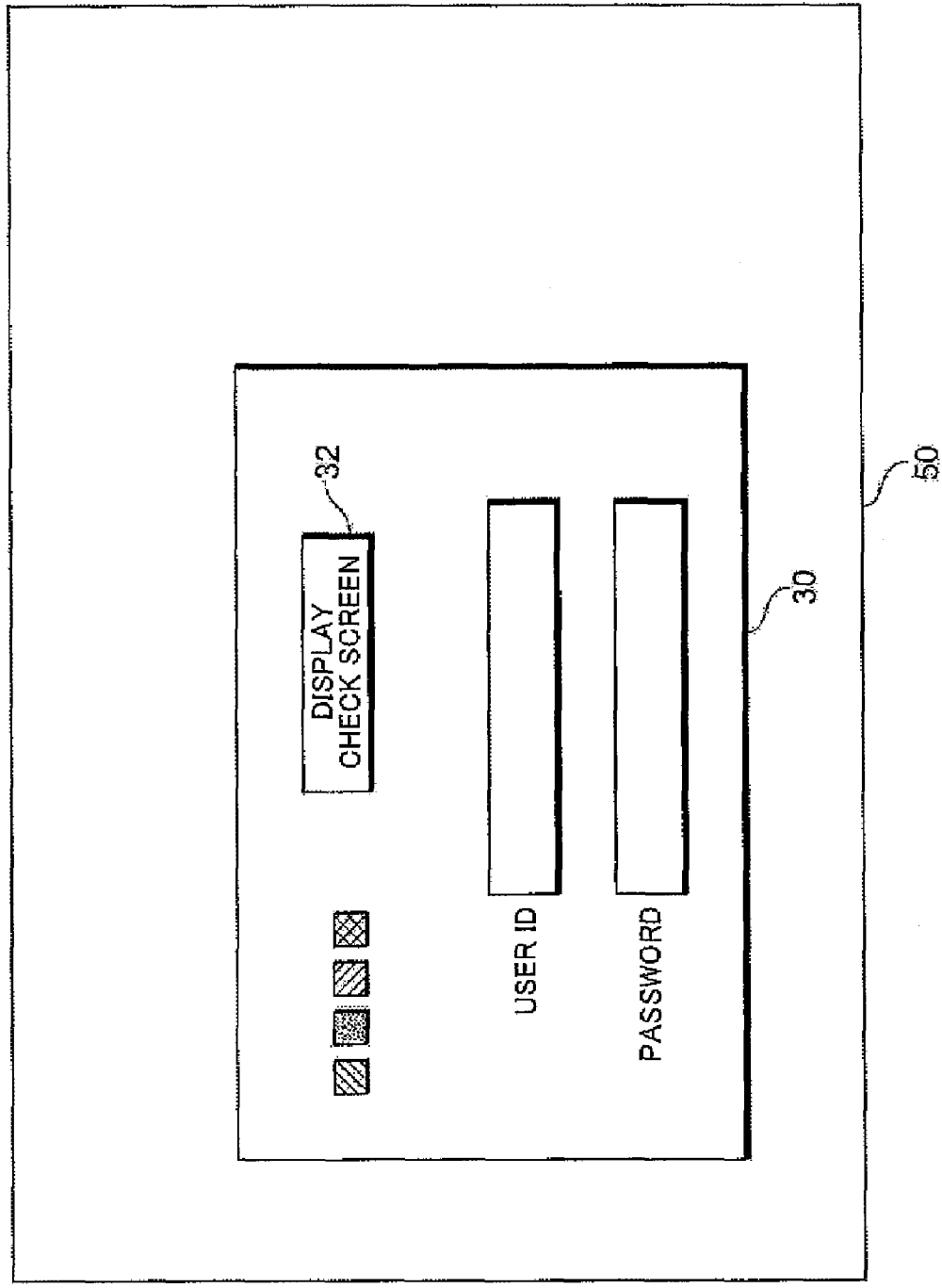
FIG. 26 is a diagram showing an example of a screen displayed on a display unit 50 of the personal computer 14.

FIG. 26 is a diagram showing an example of a screen displayed on the display unit 50 of the personal computer 14. In the example shown in FIG. 26, the HTML document received by the personal computer 14 is for displaying the login screen 30 on the display unit 50 of the personal computer 14 and the check image created in the image server 18 is displayed in a part of the login screen 30. Also displayed in a part of the login screen 30 is a check image display button 32 for accessing the check server 12 and displaying the check image on the display unit 50, and the check image display button 32 prompts the user to access the check server 12.

When the user clicks on the check image display button 32 to have the personal computer 14 transmit the site ID of the site server 10 to the check server 12 (S814), the check server 12 creates a check image based on the time the user accessed the check server 12 from the personal computer 14 and the site ID of the site server 10 (S816). The check server 12 then transmits the created check image to the personal computer 14 (S818), and the personal computer 14 displays a screen containing the received check image (S820).

Figure 27:
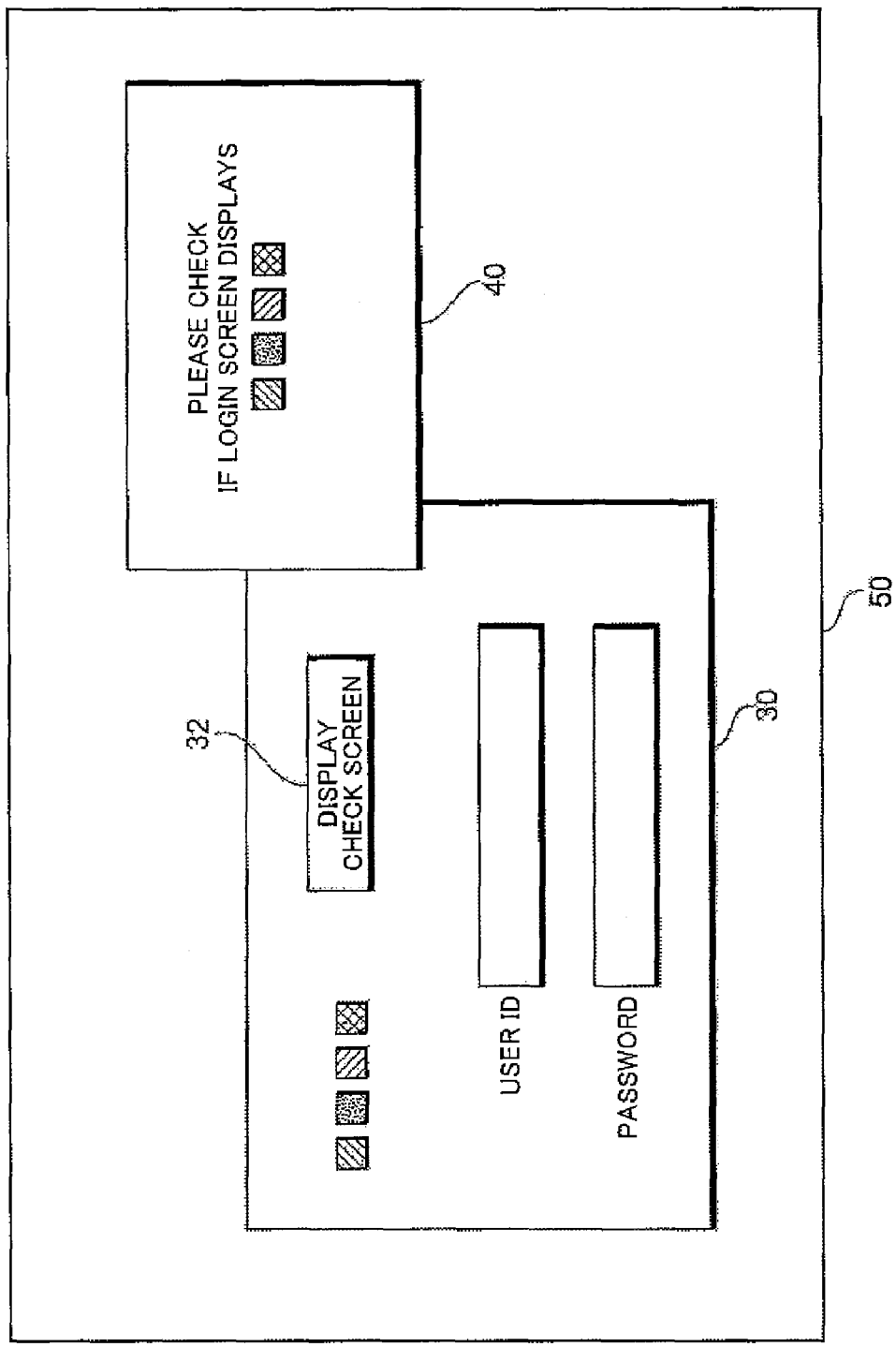
FIG. 27 is a diagram showing an example of a screen displayed on the display unit 50 of the personal computer 14.

FIG. 27 is a diagram showing an example of the screen displayed on the display unit 50 of the personal computer 14 in S820. In the example shown in FIG. 27, the personal computer 14 displays on the display unit 50 a new check screen 40 that contains the check image received from the check server 12.

Figure 28:
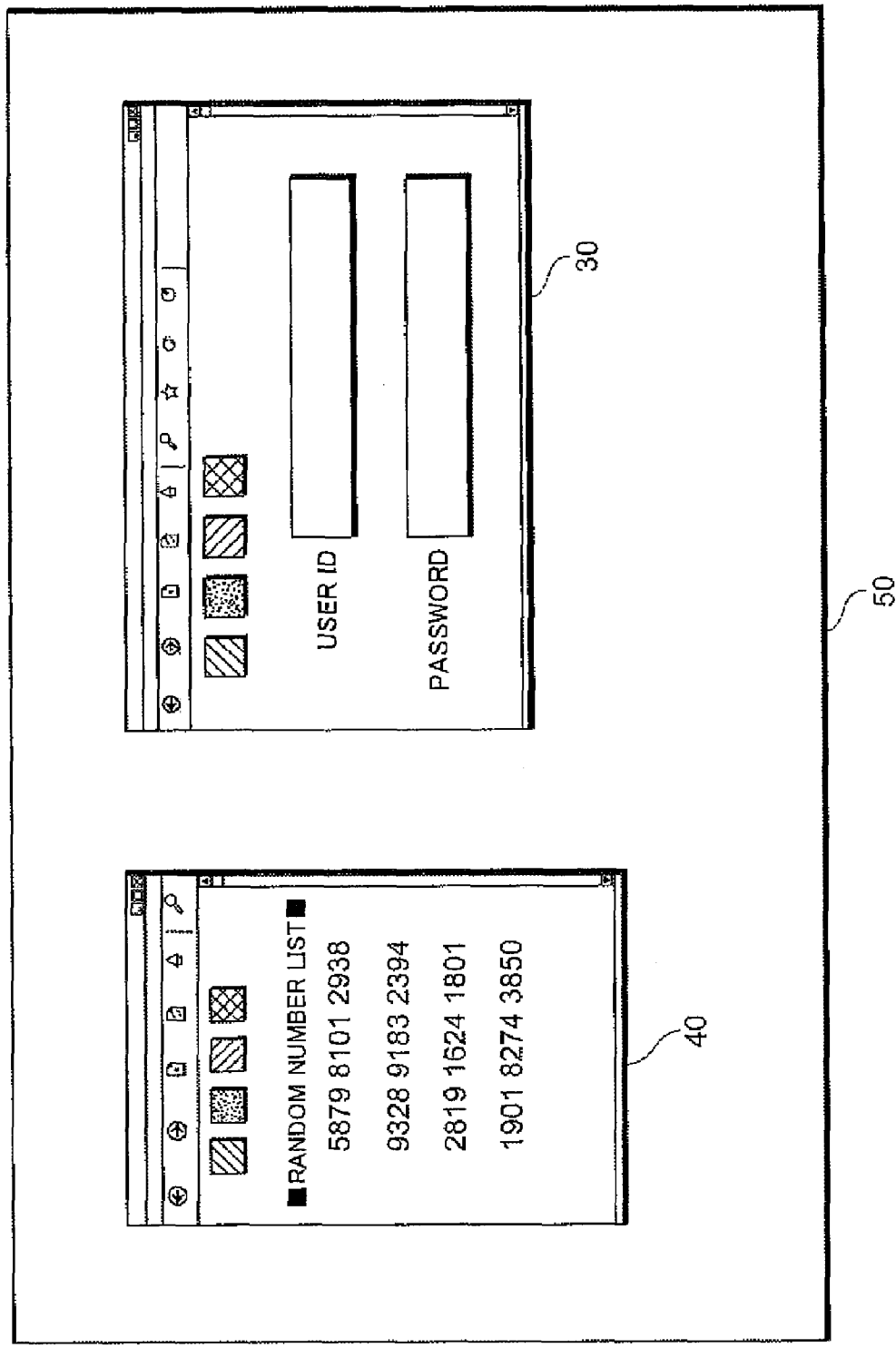
FIG. 28 is a diagram showing another example of a screen displayed on the display unit 50 of the personal computer 14

FIG. 28 is a diagram showing another example of the login screen 30 and the check screen 40 displayed on the display unit 52 in S812 and in S820. In the examples shown in FIGS. 26 and 27, when the user clicks on the check image display button 32 in the login screen 30, the check screen 40 is displayed on the display unit 50. However, in this example, the login screen 30 does not include the check screen display button 32, and the check server 12 has the personal computer 14 display the new check screen 40 independently of the login screen 30.

Specifically, when the user separately opens a screen (check screen 40) of a browser or similar in S814 and specifies a check server 12 URL that has been bookmarked in advance or a check server 12 IP address that has been registered in advance to cause the personal computer 14 to access the check server 12, the check server 12 creates the check image and transmits the check image to the personal computer 14 (S816 and S818). Then the personal computer 14 displays the received check image on the check screen 40. In this example, the check server 12 also transmits a presentation pattern (see the second embodiment) to the personal computer 14, and so the personal computer 14 also displays the presentation pattern in the check screen 40.

According to this embodiment, since the personal computer 14 accesses the site server 10 (image server 18) and the check server 12 respectively to display the check images, whether the site the user has accessed is legitimate or not can be easily checked. In addition, when the user specifies a URL that has been bookmarked in advance or an IP address that has been registered in advance to have the personal computer 14 access the check server 12, the user can be prevented from accessing a phishing site when the check image 40 is displayed. Especially in the arrangement in which the access to the check server 12 is made by specifying the IP address that has been registered in advance, a DNS server does not have to be used, so security can further be enhanced.

[Ninth Embodiment]

This embodiment is a modification of the eighth embodiment, and whether the site the user accessed is legitimate or not is checked by the site server 10 transmitting the IP address acquired from the personal computer 14 to the check server 12. The below description will describe this embodiment, mainly the points different from the first to eighth embodiments.

Figure 29:
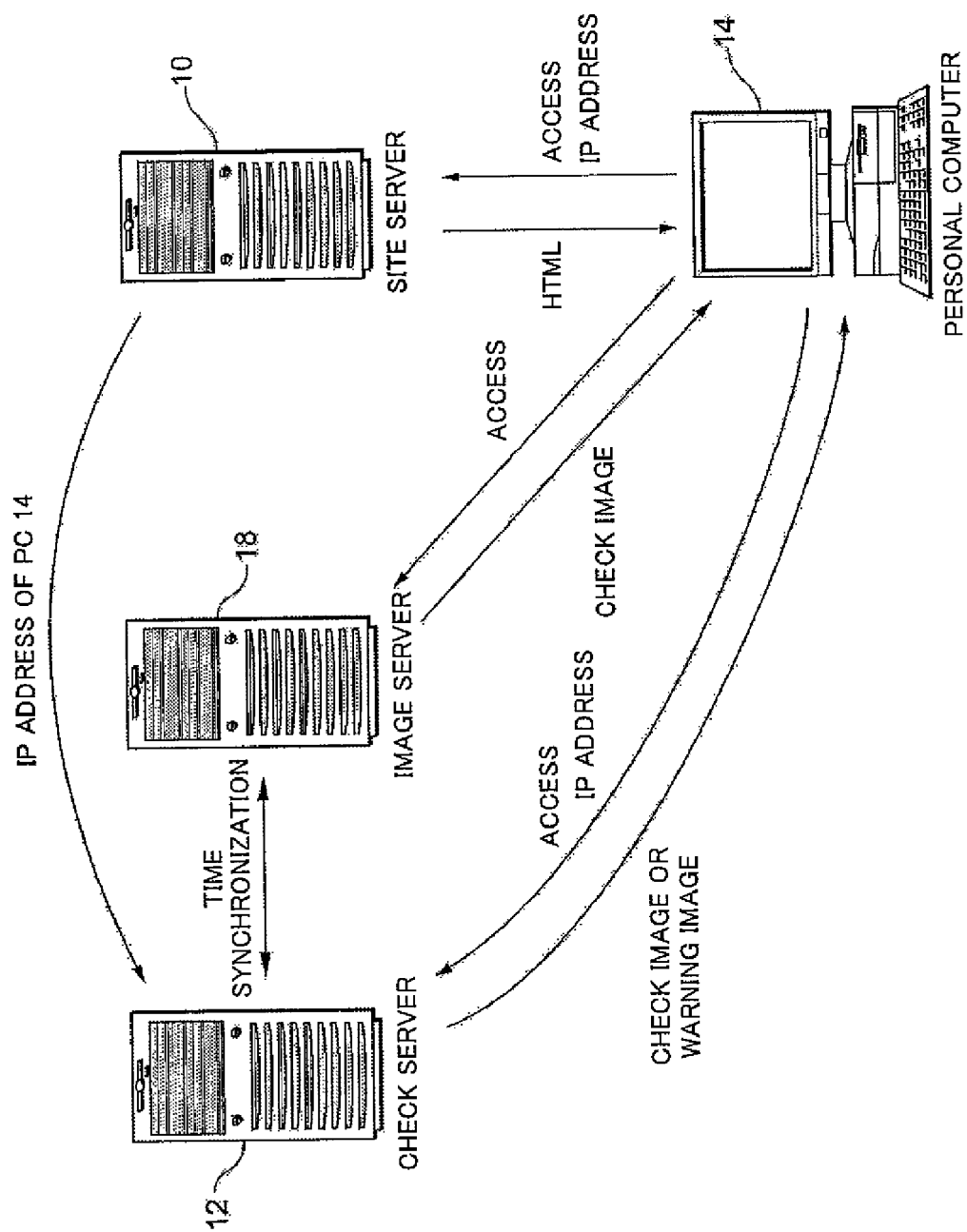
FIG. 29 is a schematic diagram showing a system that performs a site check method according to a ninth embodiment.

FIG. 29 is a schematic diagram showing a system that performs a site check method according to this embodiment. In the system in this embodiment, the site server 10 is configured so as to enable communication with the check server 12.

Figure 30:
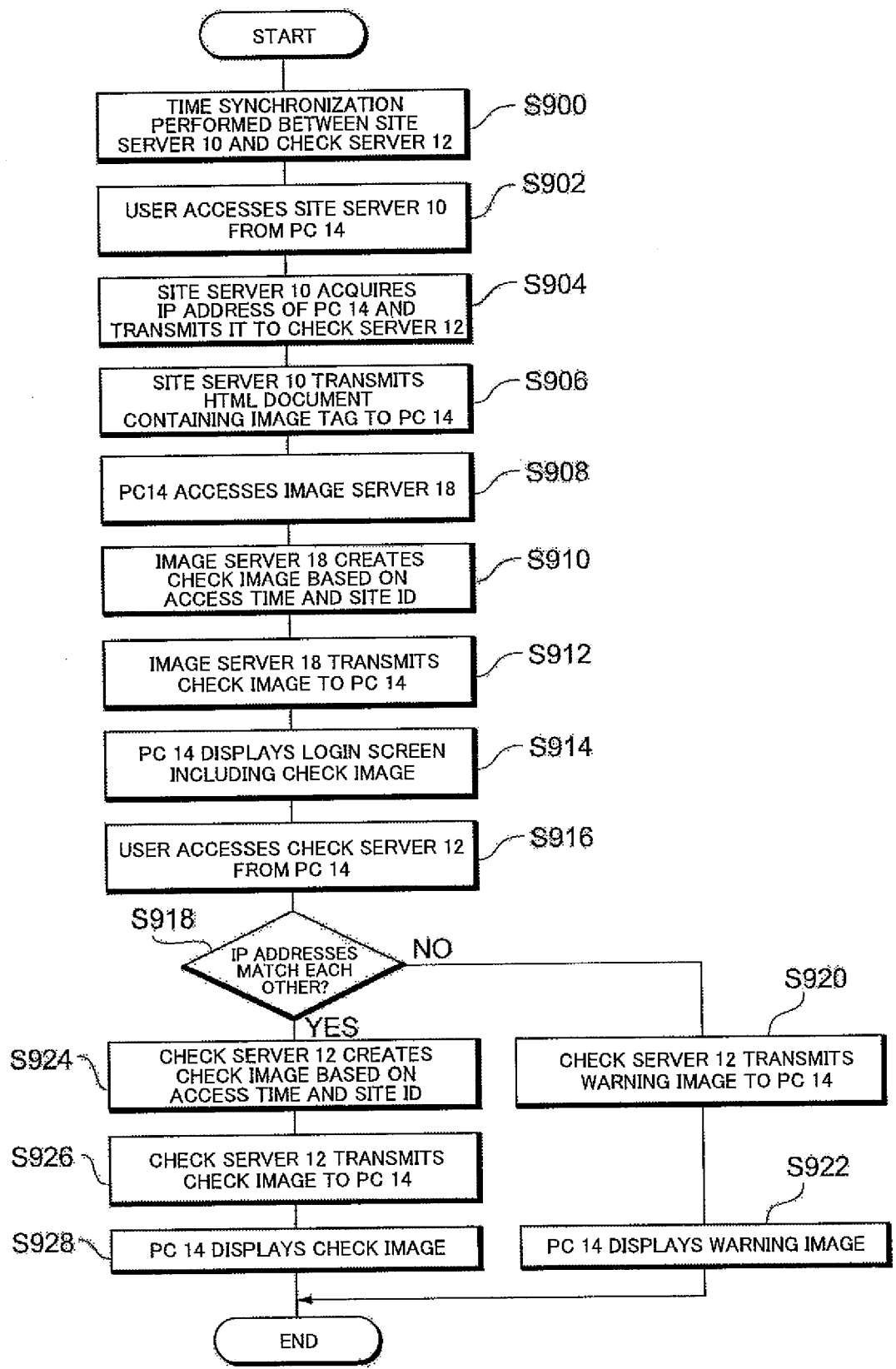
FIG. 30 is a flowchart explaining a processing sequence in the site check method according to the ninth embodiment.

FIG. 30 is a flowchart explaining a processing flow in the site check method according to this embodiment. Although the processing is sequentially explained in the below flowchart, the processing is not limited to this sequence. Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 30 the check server 12 and the image server 18 synchronize in advance the times of their internal timers (S900). When the user accesses the site server 10 from the personal computer 14 (S902), the site server 10 acquires from the personal computer 14 its IP address and transmits the IP address to the check server 12 (S904). Here, if whether or not an access to the check server 12 has been made is later checked for each user, the site server 10 may additionally receive information for identifying the user from the personal computer 14 and transmit this additional information together with the IP address to the check server 12. When accessed by the personal computer 14, the site server 10 transmits an HTML document containing an image tag to the personal computer 14 (S906).

Next, the personal computer 14 accesses the image server 18 based on the image tag contained in the acquired HTML document and transmits the site ID of the site server 10 (S908) to the image server 18. Then the image server 18 starts the program for creating check images to create a check image (S910). Specifically, the image server 18 creates the check image based on the time the personal computer 14 accessed the image server 18 and the site ID of the site server 10 transmitted from the personal computer 14. Then the image server 18 transmits the created check image to the personal computer (S912), and the personal computer 14 displays on its display unit a login screen based on the HTML document transmitted from the site server 10 and the check image transmitted from the image server 18 (S914).

Next, the user clicks on the check image display button 32 (see FIG. 26) to transmit the site ID of the site server 10 from the personal computer 14 to the check server 12 (S916), the check server 12 acquires the IP address from the personal computer 14 and checks whether or not the IP address matches the IP address transmitted from the site server 10 in S904 (S918). If whether or not an access to the check server 12 has been made is checked for each user, the check server 12 may additionally receive information for identifying the user from the personal computer 14 and may further check whether or not this additional information matches the information that has been transmitted together with the IP address from the site server 10.

In this example, the user clicks on the check screen display button 32 displayed in the login screen 30 to access the check server 12 in S916. However, in another arrangement, the URL of the check server 12 may be bookmarked in advance so that the personal computer 14 transmits the site ID to the check server 12 when the user separately opens a screen and accesses the bookmarked URL. In this case, the site server 10 and/or the image server 18 may display a predetermined screen on the personal computer 14 to prompt the user to access the bookmarked URL. With this arrangement, even if the user accesses a phishing site and a login screen 30 provided at this phishing site is displayed, the user can access the proper check server 12.

If the IP addresses do not match each other (S918: No), the check server 12 transmits a warning image to the personal computer 14 (S920), and the personal computer 14 displays the received warning image (S922) and reports to the user that there might be an illegitimate site such as a phishing site between the personal computer 14 and the site server 10.

Figure 31:
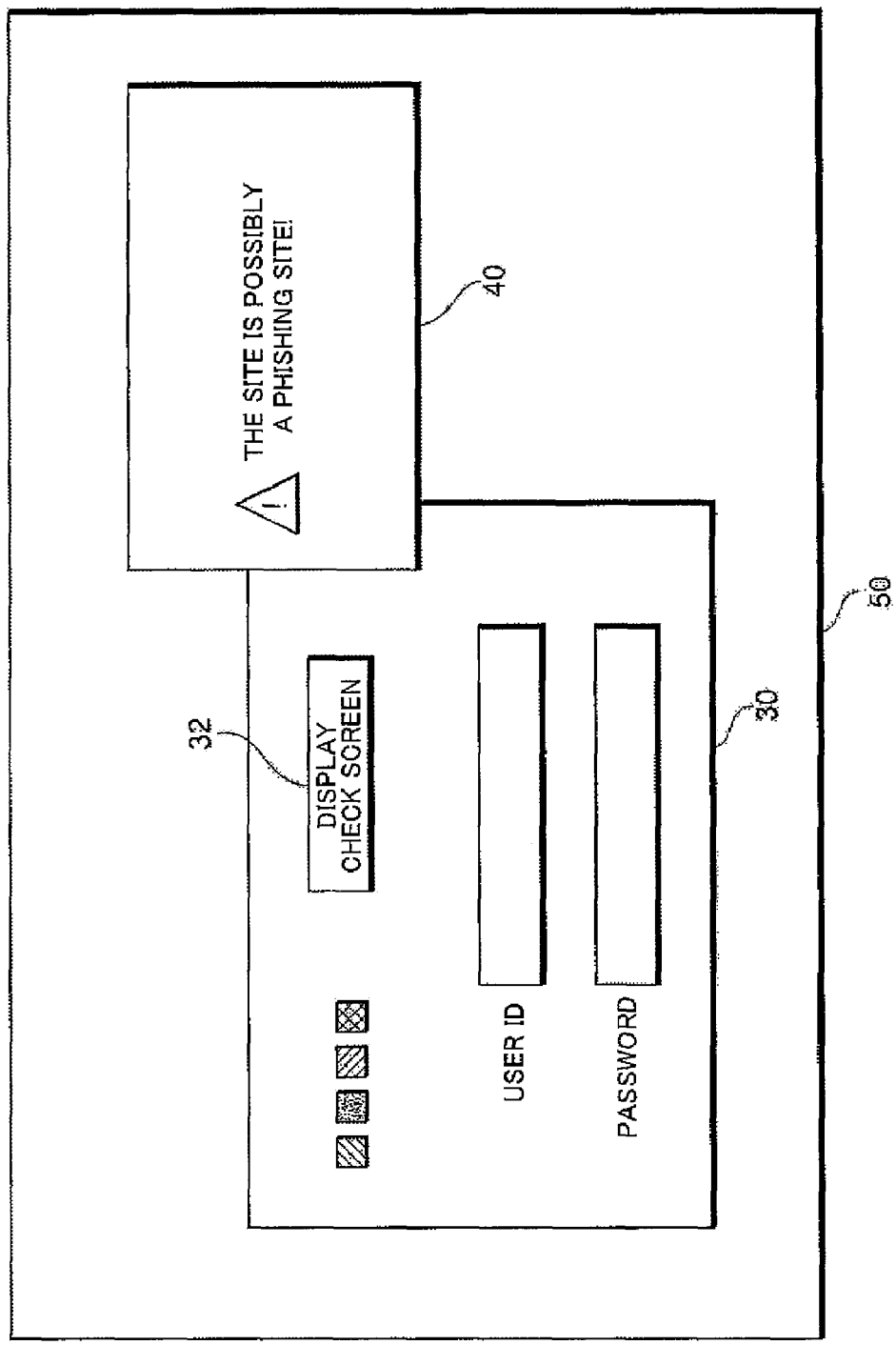
FIG. 31 is a diagram showing an example of a screen displayed on the personal computer 14.

FIG. 31 is a diagram showing an example of the screen displayed on the personal computer 14 in S922. In the example shown in FIG. 31, the warning image transmitted from the check server 12 is displayed instead of the check image in a part of the check screen 40.

On the other hand, if the IP addresses match with each other (S918: Yes), the login screen including the check image is displayed on the personal computer 14 (S924 to S928) like in the eighth embodiment (FIG. 25, S816 to S820).

According to this embodiment, since the check server 12 compares the IP address acquired from the personal computer 14 with the IP address transmitted from the site server 10, even if there is a phishing site between the site server 10 and the personal computer 14, whether the site the user has accessed is legitimate not can be properly checked.

[Tenth Embodiment]

This embodiment is a modification of the eighth embodiment. In this embodiment, the check server 12 stores in advance a predetermined cookie in the personal computer 14 and the check server 12 updates this cookie when the personal computer 14 accesses the check server 12. The below description will describe this embodiment, mainly the points different from the first to ninth embodiments.

Figure 32:
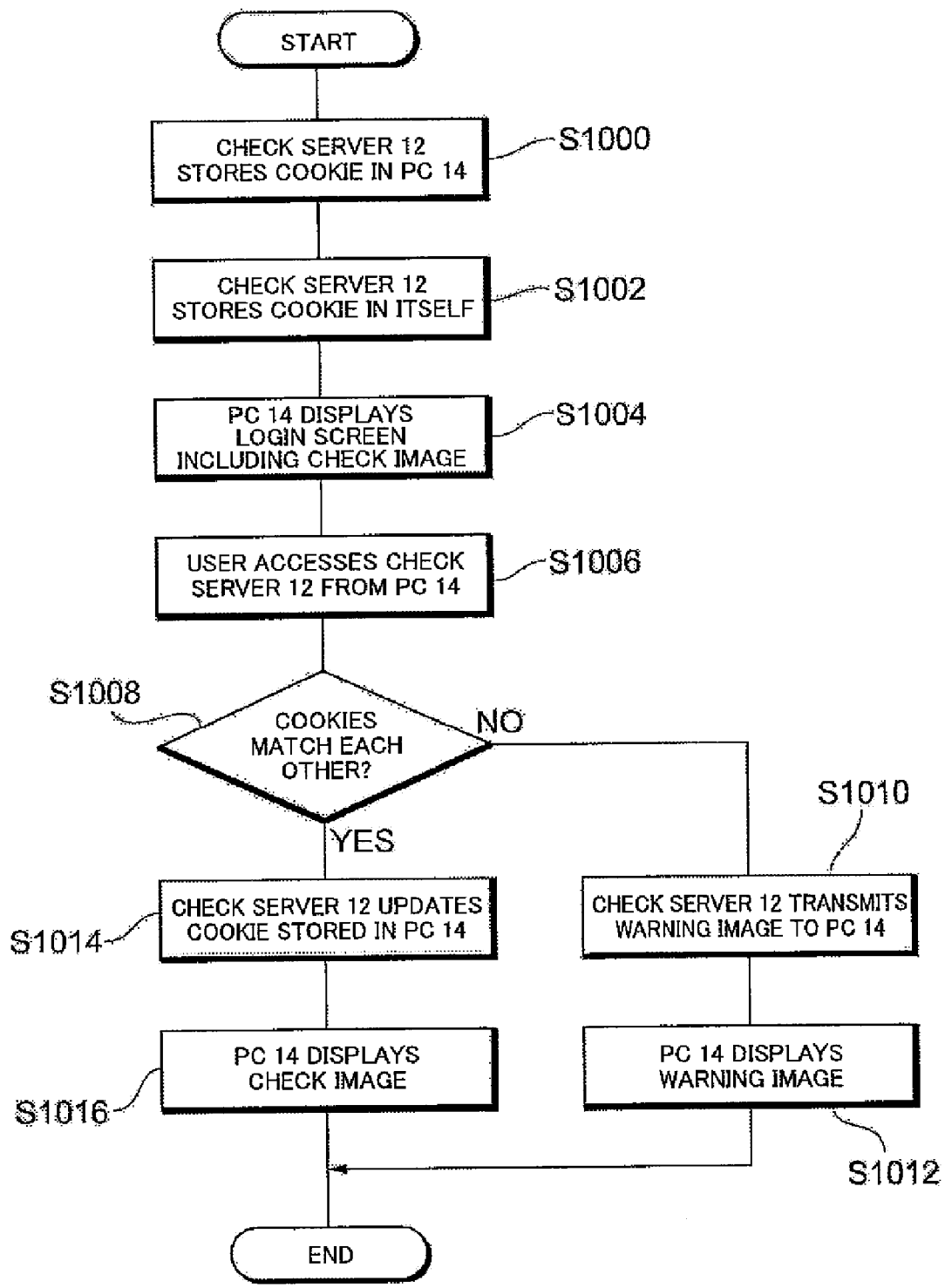
FIG. 32 is a flowchart explaining a processing sequence in a site check method according to a tenth embodiment.

FIG. 32 is a flowchart explaining a processing sequence in a site check method according to this embodiment. Although the processing is sequentially explained in the below flowchart, the processing is not limited to this sequence. Accordingly, the sequence may be rearranged or some operations may be performed in parallel as long as that change does not cause a different operation result. In steps in which processing the same as that in other embodiments is performed, that processing can be performed the same way as in those embodiments.

As shown in FIG. 32, the check server 12 first stores a cookie containing an access key in the personal computer 14 (S1000). The access key is information used for checking, when the user accesses the check server 12 from the personal computer 14, etc., whether or not the access is legitimate, the access key consisting of a letter string, a number string, etc.

For example, when the user accesses the check server 12 from the personal computer 14 and registers oneself as a user, the check server 12 stores a cookie in the personal computer 14. The check server 12 also stores the same cookie in itself (S1002). The check server 12 may be configured so that it stores only an access key contained in the cookie.

Next, like in the eighth embodiment (FIG. 25, S800 to S812), the personal computer 14 displays on its display unit a login screen based on an HTML document transmitted from the site server 10 and the check image transmitted from the image server 18 (S1004).

When the user then accesses the check server 12 from the personal computer 14 (S1006), the check server 12 acquires the cookie stored in the personal computer 14 and judges whether or not this cookie matches the cookie stored in the check server 12 (S1008).

If it is determined that the cookies do not match each other (S1008: No), the check server 12 transmits a warning image to the personal computer 14 (S 010), and the personal computer 14 displays the received warning image (S1012) to report to the user that a third party might have illegitimately accessed the check server 12 by acquiring the cookie stored in the personal computer 14.

On the other hand, if it is determined that the cookies match with each other (S1008: Yes), the check server 12 updates the cookie stored in the personal computer 14 (S1014). Specifically, the check server 12 creates an access key to be used when the user accesses the check server 12 from the personal computer 14 next time and replaces the old access key contained in the cookie that had been stored in the personal computer 14 with the newly-created access key, thereby updating the cookie. The check server 12 also updates the cookie stored in the check server 12 in the same way.

The check server then has the personal computer 14 display the login screen including the check image (S1016) like in the eighth embodiment (FIG. 25, S816 to S820).

According to this embodiment, since the check server 12 updates the cookie stored in the personal computer 14 and the like every time the check server 12 has the personal computer 14 display a check image, if the third party illegitimately acquires the cookie stored in the personal computer 14 and accesses the check server 12 from another personal computer, etc., the check server 12 updates the cookies stored in the other personal computer and in the check server 12. Accordingly, when the user accesses the check server 12 from the personal computer 14 after the third party accessed the check server 12, the cookie stored in the personal computer 14 and the cookie stored in the check server 12 do not match each other, which allows the user to easily notice that an illegitimate access has been made to the user's personal computer 14.

In this embodiment, an example in which the user accesses the check server 12 from the personal computer 14 has been described. However, for example, the user may copy or migrate the cookie stored in the personal computer 14 to another personal computer 14, a PDA or similar using a memory device such as a USB memory and access the check server 12 from that other personal computer 14, PDA or similar.

[Eleventh Embodiment]

In the first to tenth embodiments, the check information or the check image is displayed in the login screen 30 to which both the user ID and the password are input. In the eleventh embodiment, however, an input screen for a user ID and an input screen for a password are separately displayed and check information or a check image are displayed on the password input screen. The below description will describe this embodiment, mainly the points different from the first to tenth embodiments.

Figure 33:
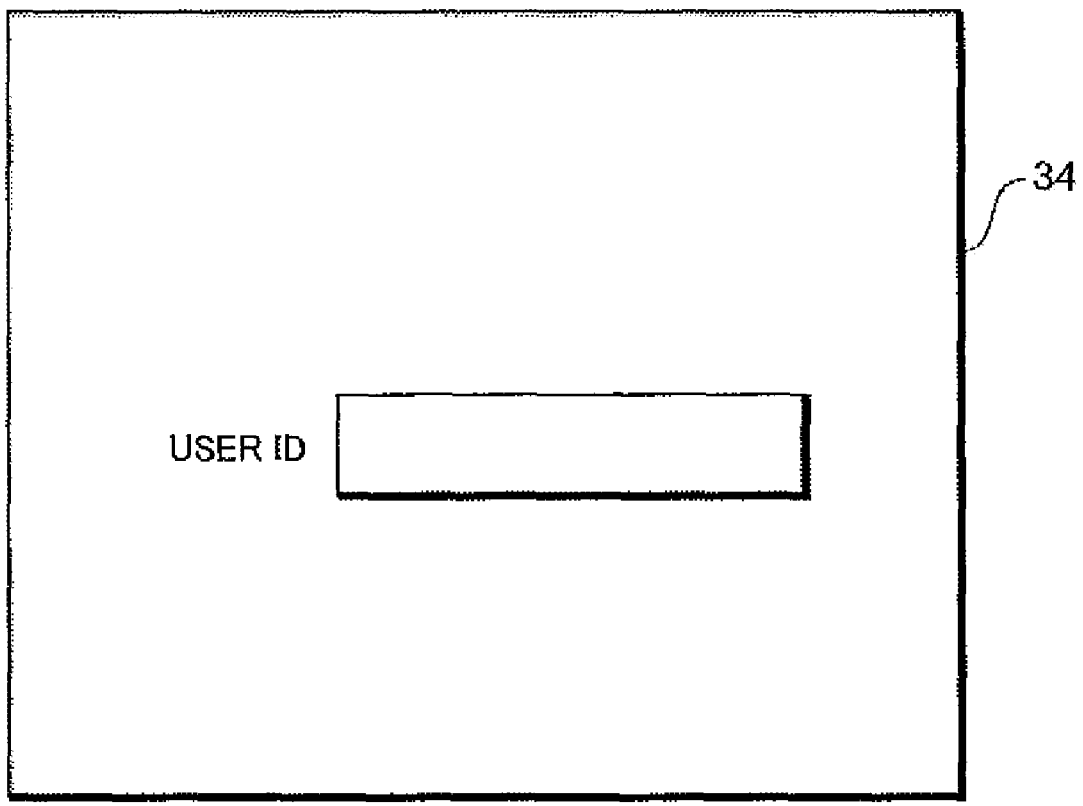
FIG. 33 is a diagram showing an example of a screen displayed on the personal computer 14 in a site check method according to an eleventh embodiment.
Figure 34:
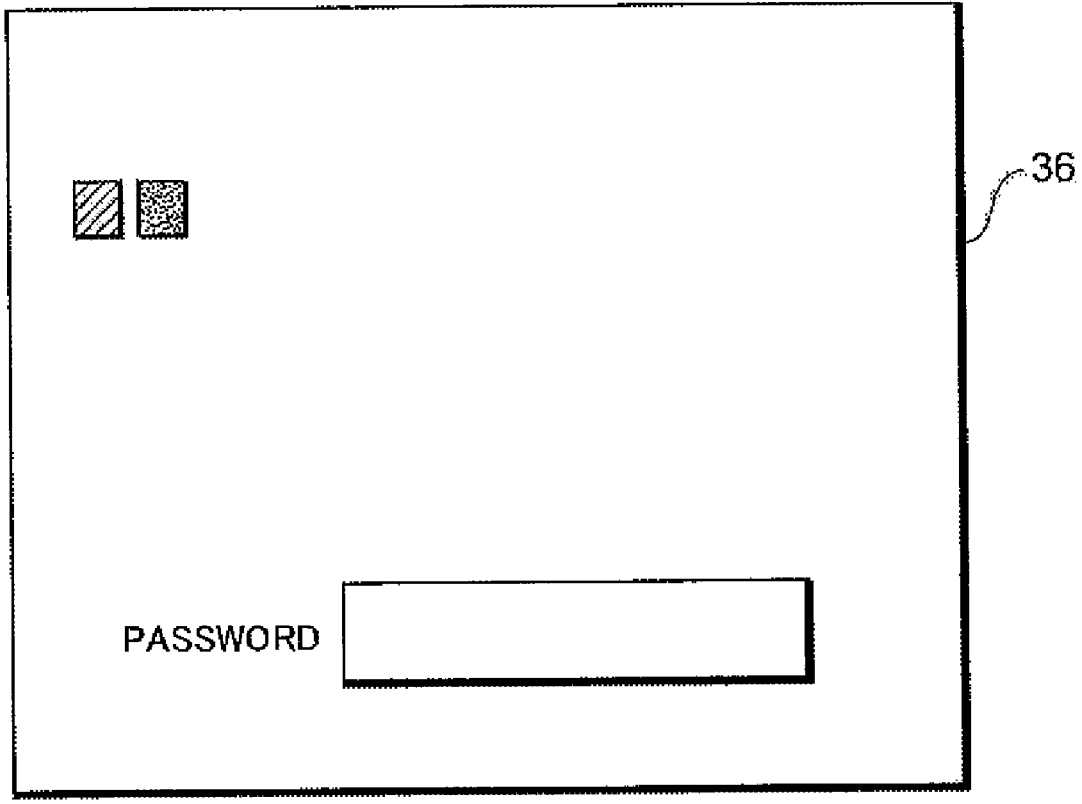
FIG. 34 is a diagram showing an example of a screen displayed on the personal computer 14 in the site check method according to the eleventh embodiment.

FIGS. 33 and 34 are diagrams showing examples of screens displayed on the personal computer 14 in a site check method according to this embodiment. FIG. 33 shows a user ID input screen 34 for prompting the user to input a user ID, while FIG. 34 shows a password input screen 36 for prompting the user to input a password.

In this embodiment, when the user accesses the site server 10 from the personal computer 14, the site server 10 has the personal computer 14 display the user ID input screen 34 to prompt the user to input the user ID. When the personal computer 14 transmits the input user ID to the site server 10, the check server 12 and/or the image server 18, the site server 10, the check server 12 and/or the image server 18 has the personal computer 14 display the password image screen 36 including check information or a check image in order to prompt the user to input the password. Here, the site server 10, the check server 12 and/or the image server 18 may create the check information or the check image based on the user ID.

According to this embodiment, the server(s) has the personal computer display the check information or the check image based on the user ID, and whether the site the user has accessed is a legitimate one or not can be checked more correctly.

The examples and application examples described in the above embodiments of the invention may be used by combining some of them or by adding some modifications or improvements to them depending on purpose, and this invention is not limited to the above-described embodiments. It is clear, from the descriptions in the scope of claims section, that such combinations of embodiments or modified or improved embodiments can also be included in the technical scope of this invention.

I claim:

1. A site check method for checking whether a predetermined site is legitimate or not, the method comprising the steps of:
    receiving, by a first server that is provided with site identification information and provides the predetermined site, a first access from a first information terminal used by a user and creating first check information based on a time of the first access obtained from its own time information and the site identification information;
    displaying, by the first server, a login screen containing the created first check information on the first information terminal;
    receiving, by a second server that holds the site identification information provided to the first server and synchronizes a time in the second server with a time in the first server, a second access from a second information terminal used by the user and creating second check information based on a time of the second access obtained from its own time information and the site identification information;
    displaying, by the second server, the created second check information on the second information terminal;
    comparing the first check information and the second check information; and
    determining whether the predetermined site is legitimate based on the comparison.

2. The site check method according to claim 1, further comprising the step of prompting, by the first server, the user to access the second server from the first information terminal when receiving the first access from the first information terminal.

3. The site check method according to claim 1, further comprising the steps of:
    storing, by the second server, in advance, a Uniform Resource Locator (URL) for the first server; and
    when receiving an access from the first information terminal, making, by the second server, the first information terminal transmit the site identification information containing the URL of the first server to the first information terminal, wherein the step of creating the second check information further includes comparing, by the second server, the URL contained in the site identification information transmitted from the first information terminal with the stored URL, and if it is determined that the URLs do not match with each other as a result of the comparison, transmitting information different from the second check information to the first information terminal.

4. A site check method for checking whether a predetermined site is legitimate or not, the method comprising the steps of:

receiving, by a first server that is provided with site identification information and provides the predetermined site, an access from a first information terminal used by a user, transmitting the site identification information provided to the first server to the first information terminal and prompting the user to access a third server from the first information terminal;

receiving, by the third server that synchronizes a time in the third server with a time in a second server, the access from the first information terminal and receiving the site identification information from the first information terminal;

creating, by the third server, first check information based on a time of the access obtained from its own time information and the received site identification information;

displaying, by the third server, a login screen containing the created first check information on the first information terminal;

receiving, by the second server that holds the site identification information provided to the first server, an access from a second information terminal used by the user and creating second check information based on a time of the access obtained from its own time information and the site identification information; and displaying, by the second server, the created second check information on the second information terminal;

comparing the first check information and the second check information; and determining whether the predetermined site is legitimate based on the comparison.

5. The site check method according to claim 1, further comprising the steps of:

holding, by the second server, in advance, domain information about a domain used by the user;

receiving, by the first server, an access from the first information terminal used by the user and acquiring domain information stored in the first information terminal from the first information terminal;

transmitting, by the first server, the acquired domain information to the second server;

comparing, by the second server, the transmitted domain with the domain information and transmitting the comparison result to the first server; and presenting, by the first server, the comparison result to the user.

6. The site check method according to claim 1, further comprising the steps of:

receiving, by the first server, the first access containing Internet Protocol (IP) address information from the first information terminal used by the user and acquiring the IP address information for the first information terminal;

transmitting, by the first server, the acquired IP address information to the second server;

acquiring, by the second server, the IP address information for the first information terminal from the first information terminal;

comparing, by the second server, the IP address information transmitted from the first server with the IP address information acquired from the first information terminal and transmitting the comparison result to the first server; and presenting, by the first server, the comparison result to the user.

7. A site check method for checking whether a predetermined site is legitimate or not, the method comprising the steps of:

receiving, by a first server that is provided with site identification information and provides the predetermined site, a first access from a first information terminal used by a user and creating first check information based on a time of the first access obtained from its own time information and the site identification information;

displaying, by the first server, a login screen containing the created first check information on the first information terminal;

receiving, by a second server that holds the site identification information provided to the first server and synchronizes a time in the second server with a time in the first server, a second access from the first information terminal and creating second check information based on a time of the second access obtained from its own time information and the site identification information;

displaying, by the second server, the created second check information on the first information terminal;

comparing the first check information and the second check information; and determining whether the predetermined site is legitimate based on the comparison.

8. A site check method for checking whether a predetermined site is legitimate or not, the method comprising the steps of:

receiving, by a first server that is provided with site identification information and provides the predetermined site, a first access from a first information terminal used by a user and creating first check information based on a time of the first access obtained from its own time information and the site identification information;

displaying, by the first server, a login screen containing the created first check information on the first information terminal;

receiving, by a check terminal that holds the site identification information provided to the first server and synchronizes a time in a second server with a time in the first server, site identification information input by the user and creating second check information based on its own time information and the input site identification information;

displaying, by the check terminal, the created second check information;

comparing the first check information and the second check information; and determining whether the predetermined site is legitimate based on the comparison.

9. A site check method for checking whether a predetermined site is legitimate or not, the method comprising the steps of:

transmitting, by a second information terminal used by a user, site identification for a first server that is provided with site identification information and provides the predetermined site to a second server that holds the site identification information provided to the first server and synchronizes a time in the second server with a time in the first server;

receiving, by the second server, a first access containing the site identification information from the second information terminal, setting a flag for the site identification information and storing the site identification information;

creating, by the second server, first check information based on a time of the first access obtained from its own time information and the site identification information;

displaying, by the second server, the created first check information on the second information terminal;

receiving, by the first server, a second access from a first information terminal used by the user and transmitting its own site identification information to the second server;

checking, by the second server, whether or not the flag has been set for the identification information transmitted from the first server and reporting the check result to the first server;

creating, by the first server, if the check result shows that the flag has been set for the relevant site identification information, second check information based on a time of the second access obtained from its own time information and the site identification information; and displaying, by the first server, a login screen containing the created second check information on the first information terminal.

10. The site check method according to claim 9, further comprising the step of displaying, by the first server, if the check result shows that the flag has not been set for the relevant site identification information, information different from the second check information on the first information terminal.

11. The site check method according to claim 1, further comprising the steps of:
displaying, by the second server, an overall pattern constituted by a matrix element group on the second information terminal;
receiving, by the second server, from the second information terminal a password derivation pattern based on elements selected based on the displayed overall pattern; and
associating, by the second server, the received password derivation pattern with the second information terminal and registering the associated password derivation pattern.

12. The site check method according to claim 11, further comprising the step of creating, by the second server, a presentation pattern that is constituted by the matrix element group and contains the created second check information, wherein the step of displaying the second check information comprises the second server displaying the created presentation pattern.

13. The site check method according to claim 1, further comprising the steps of:
displaying, by the first server, the login screen containing the first check information and receiving from the first information terminal a user ID and a password input in the login screen;
transmitting, by the first server, the received user ID and password to the second server; and
performing, by the second server, authentication based on the transmitted user ID and password and transmitting the authentication result to the first server.

14. The site check method according to claim 1, wherein
the first access and the second access include user identification information for identifying the user,
the first server creates the first check information based on the time for the first access, the site identification information and the user identification information, and
the second server creates the first check information based on the time for the second access, the site identification information and the user identification information.

15. The site check method according to claim 1, further comprising the steps of:
holding, by the second server, IP address information about the first information terminal;
receiving, by the first server, from the first information terminal used by the user the first access containing IP address information about the first information terminal and acquiring the IP address information about the first information terminal;
transmitting, by the first server, the acquired IP address information to the second server;
comparing, by the second server, the transmitted IP address information with the held IP address information and transmitting the comparison result to the first server; and
presenting, by the first server, the comparison result to the user.

16. The site check method according to claim 1, wherein the first check information and the second check information include plural pieces of color information.

17. The site check method according to claim 2, further comprising the steps of:
storing, by the second server, in advance, a URL for the first server; and
when receiving an access from the first information terminal, making, by the second server, the first information terminal transmit the site identification information containing the URL of the first server to the first information terminal, wherein
the step of creating the second check information further includes comparing, by the second server, the URL contained in the site identification information transmitted from the first information terminal with the stored URL, and if it is determined that the URLs do not match with each other as a result of the comparison, transmitting information different from the second check information to the first information terminal.

18. The site check method according to claim 12, further comprising the steps of:
displaying, by the first server, the login screen containing the first check information and receiving from the first information terminal a user ID and a password input in the login screen;
transmitting, by the first server, the received user ID and password to the second server; and performing, by the second server, authentication based on the transmitted user ID and password and transmitting the authentication result to the first server.

19. The site check method according to claim 2, wherein
the first access and the second access include user identification information for identifying the user,
the first server creates the first check information based on the time for the first access, the site identification information and the user identification information, and
the second server creates the first check information based on the time for the second access, the site identification information and the user identification information.

20. The site check method according to claim 4, wherein
the first access and the second access include user identification information for identifying the user,
the first server creates the first check information based on the time for the first access, the site identification information and the user identification information, and
the second server creates the first check information based on the time for the second access, the site identification information and the user identification information.

* * * * *

UNITED STATES PATENT AND TRADEMARK OFFICE
CERTIFICATE OF CORRECTION

PATENT NO. : 8,312,538 B2  
APPLICATION NO. : 12/065504  
DATED : November 13, 2012  
INVENTOR(S) : Hideharu Ogawa Page 1 of 1

It is certified that error appears in the above-identified patent and that said Letters Patent is hereby corrected as shown below:

In the Claims

At column 24, line number 50, in claim 8, delete "a time in a second server" and insert --its own time--, therefor.
At column 24, line numbers 62-63, in claim 9, delete "for a first server that is provided with site identification information" and insert --information provided to a first server that--, therefor.
At column 26, line number 1, in claim 14, delete "first" and insert --second--, therefor.
At column 26, line number 57, in claim 19, delete "first" and insert --second--, therefor.
At column 26, line number 66, in claim 20, delete "first" and insert --second--, therefor.

Signed and Sealed this
Ninth Day of December, 2014

Michelle K. Lee
*Deputy Director of the United States Patent and Trademark Office*